United States Patent [19]

Lynch et al.

[11] Patent Number: 4,937,851

[45] Date of Patent: * Jun. 26, 1990

[54] LOOP STATUS VERIFICATION SYSTEM

[75] Inventors: Daniel Lynch; James P. Hogan, both of Jackson, N.J.

[73] Assignee: Keptel, Inc., Tinton Falls, N.J.

[*] Notice: The portion of the term of this patent subsequent to Sep. 5, 2006 has been disclaimed.

[21] Appl. No.: 345,017

[22] Filed: Apr. 28, 1989

Related U.S. Application Data

[63] Continuation-in-part of Ser. No. 222.087, Jul. 20, 1988, Pat. No. 4,864,598.

[51] Int. Cl.$^5$ .............................................. H04B 3/46
[52] U.S. Cl. ........................................... 379/6; 379/27; 379/32
[58] Field of Search ........................... 379/6, 27, 32, 33

[56] References Cited

U.S. PATENT DOCUMENTS

| | | | |
|---|---|---|---|
| 3,752,940 | 8/1973 | Santulli et al. | 179/175.2 |
| 3,814,868 | 6/1974 | Bradley | 179/175.3 |
| 3,927,265 | 11/2197 | Roedel et al. | 179/2 |
| 3,930,246 | 12/1975 | Campbell | 340/214 |
| 3,979,559 | 9/1976 | Roedel et al. | 179/2 |
| 4,442,320 | 4/1984 | James et al. | 179/5 |
| 4,453,049 | 6/1984 | Daniels et al. | 179/175.2 |
| 4,528,423 | 7/1985 | James et al. | 179/5 |
| 4,741,022 | 4/1988 | Chebra et al. | 379/106 |

*Primary Examiner*—Stafford D. Schreyer
*Attorney, Agent, or Firm*—Peter L. Michaelson

[57] ABSTRACT

A system is disclosed for verifying the integrity of each one of a number of communication paths, illustratively telephone subscriber loops, that runs between a near end location, illustratively a telephone company central office, and a corresponding remote ("far end") location(s). This system utilizes circuitry, such as a line verification module, that is located at the far end of each path to impart a selected test signal specifically a selected one of a number of sub-audible frequencies, thereto. In one embodiment, the circuitry continously transmits a test signal over the path. The level of the test signal is automatically adjusted such that this signal remains at an approximately constant amplitude regardless of whether that path is in an on-hook or off-hook condition. Central office monitoring circuitry is connected to the near end of every path being verified. For each such path, the monitoring circuitry first "learns" the frequency associated with the test signal appearing over that path, and thereafter detects a cessation or unexpected change in the test signal occurring at the near end thereof that is indicative of a possible loss of path (e.g. loop) integrity and, in turn, provides an appropriate notification specifying that loss.

33 Claims, 23 Drawing Sheets

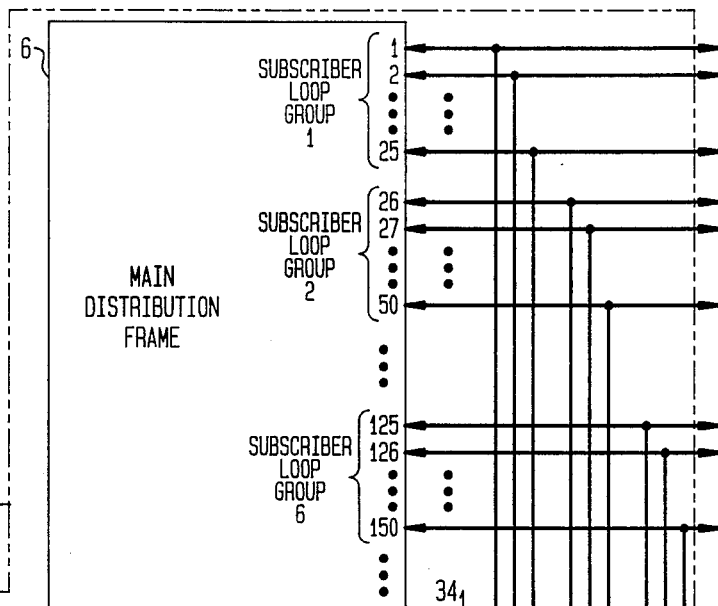
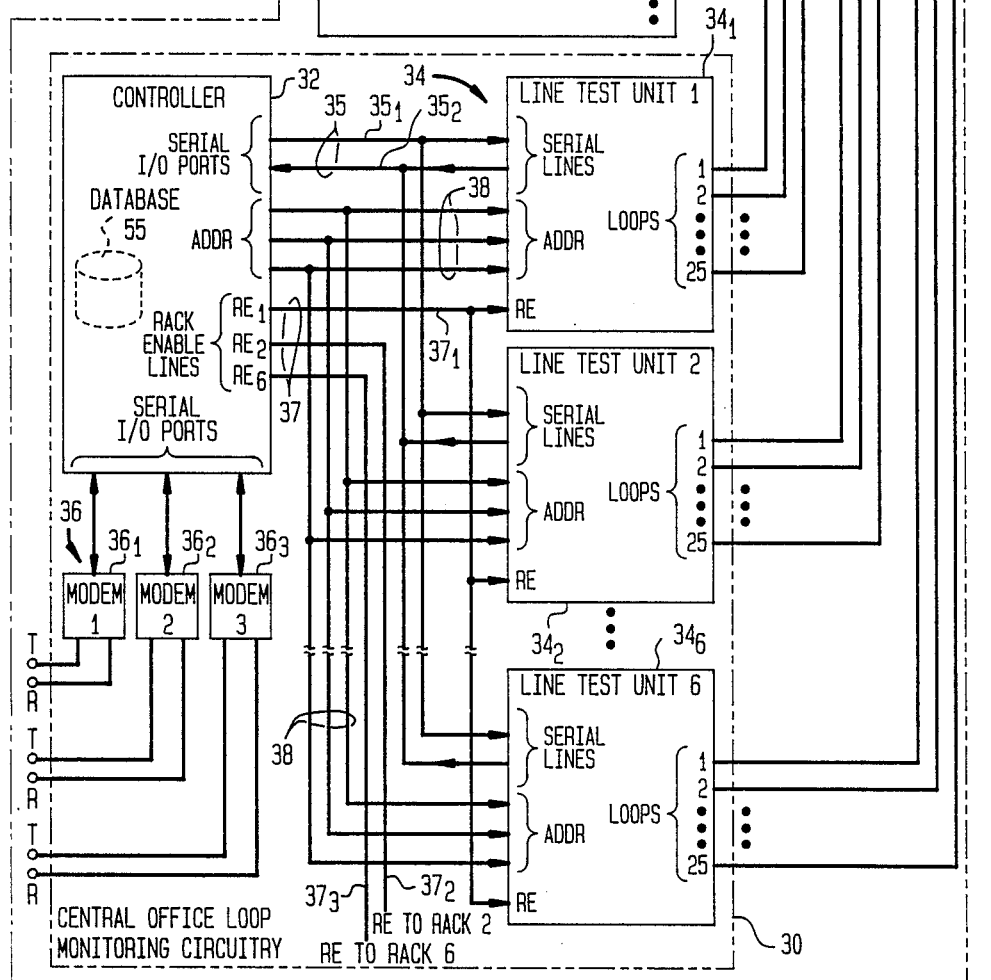
FIG. 1
FIG. 1A

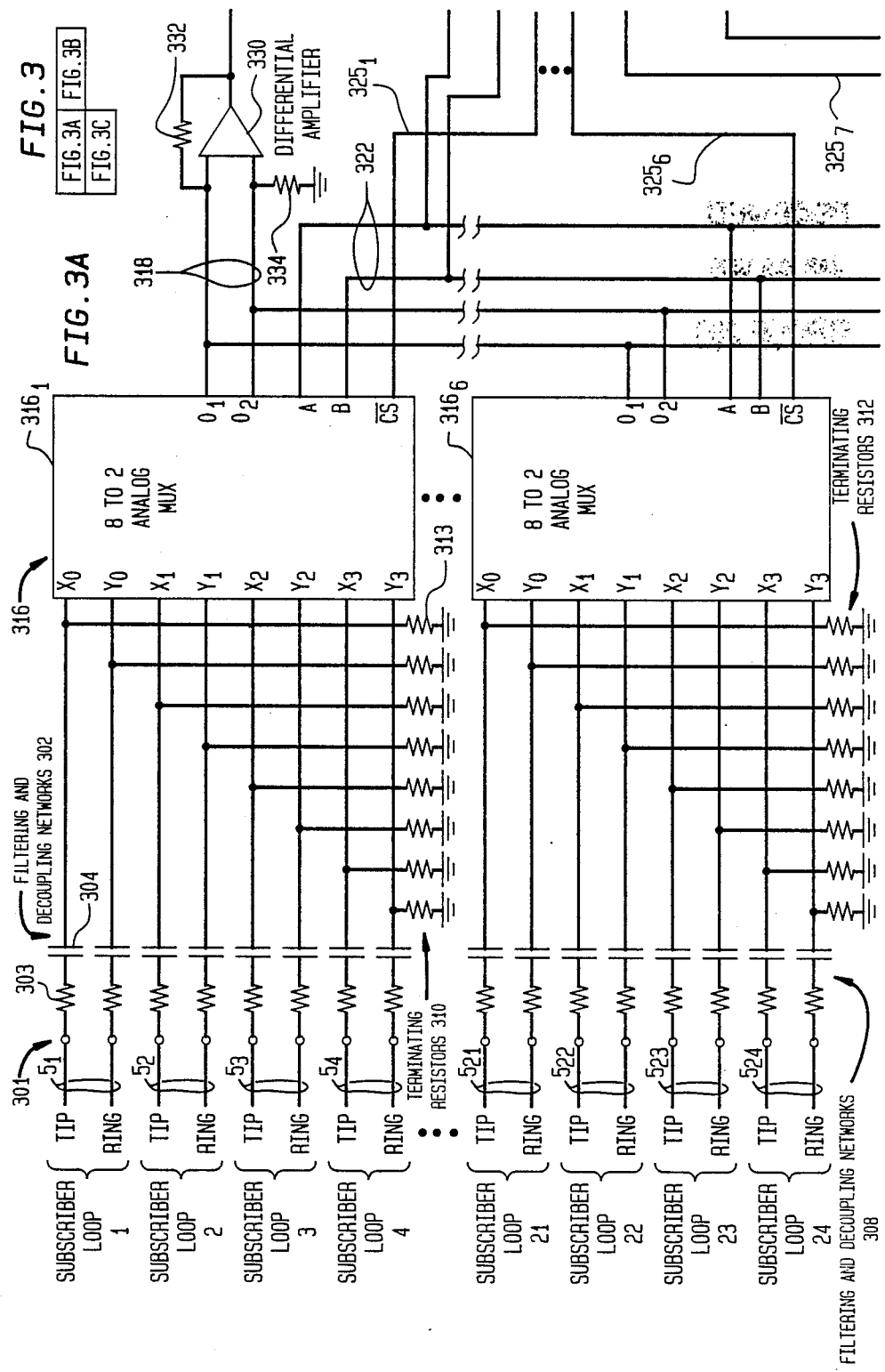

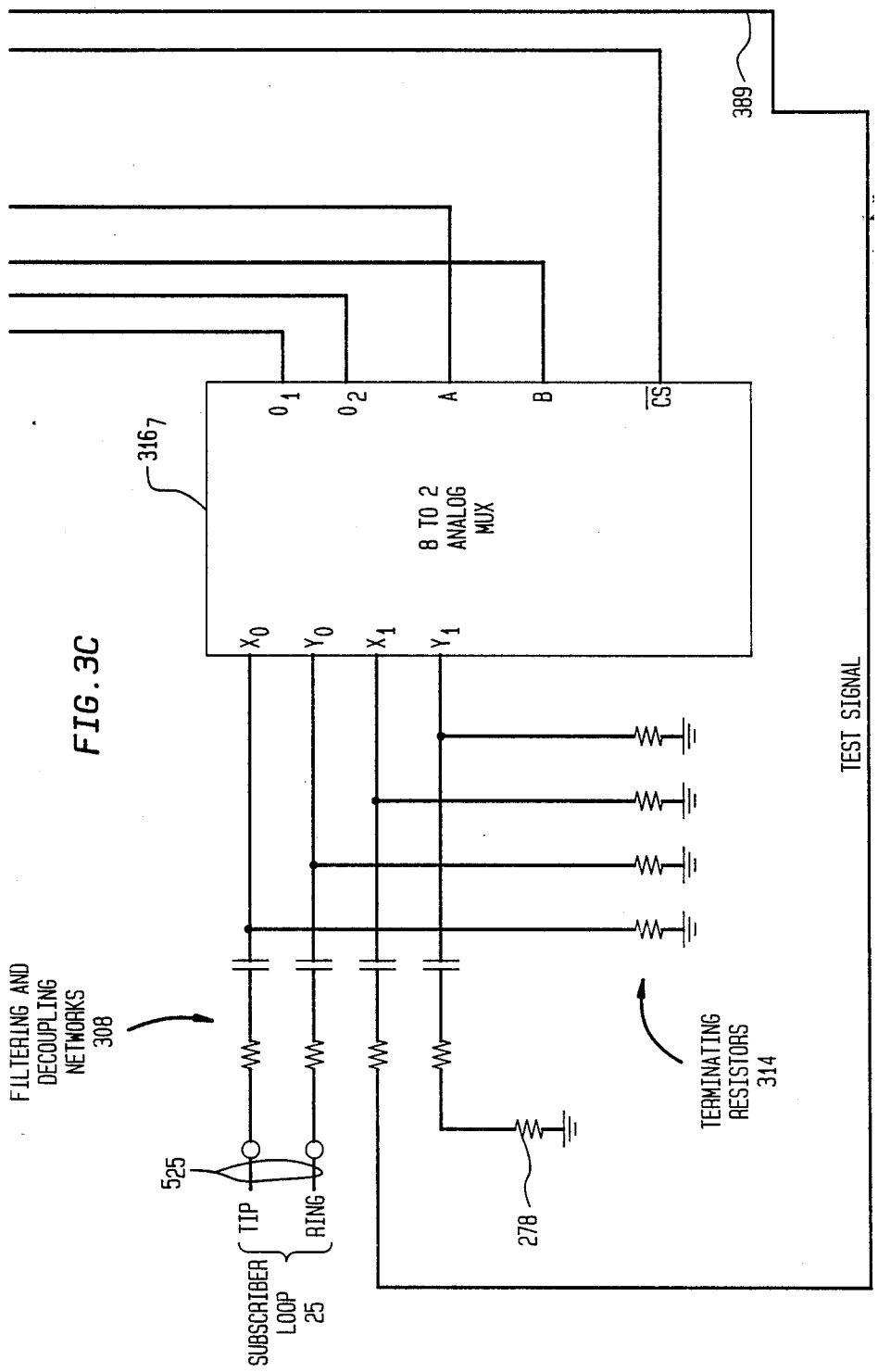

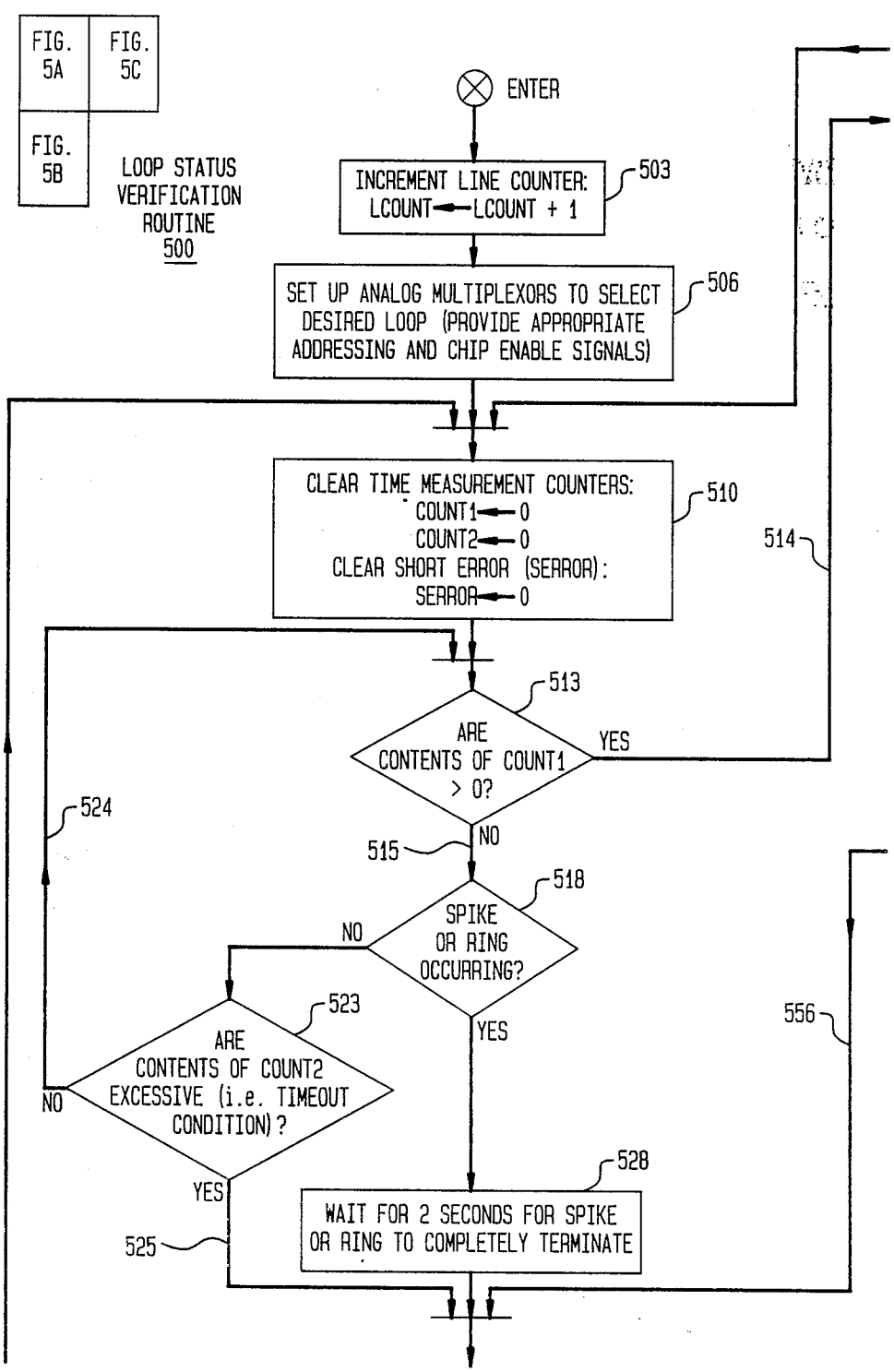

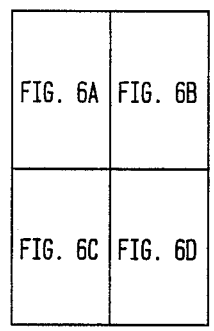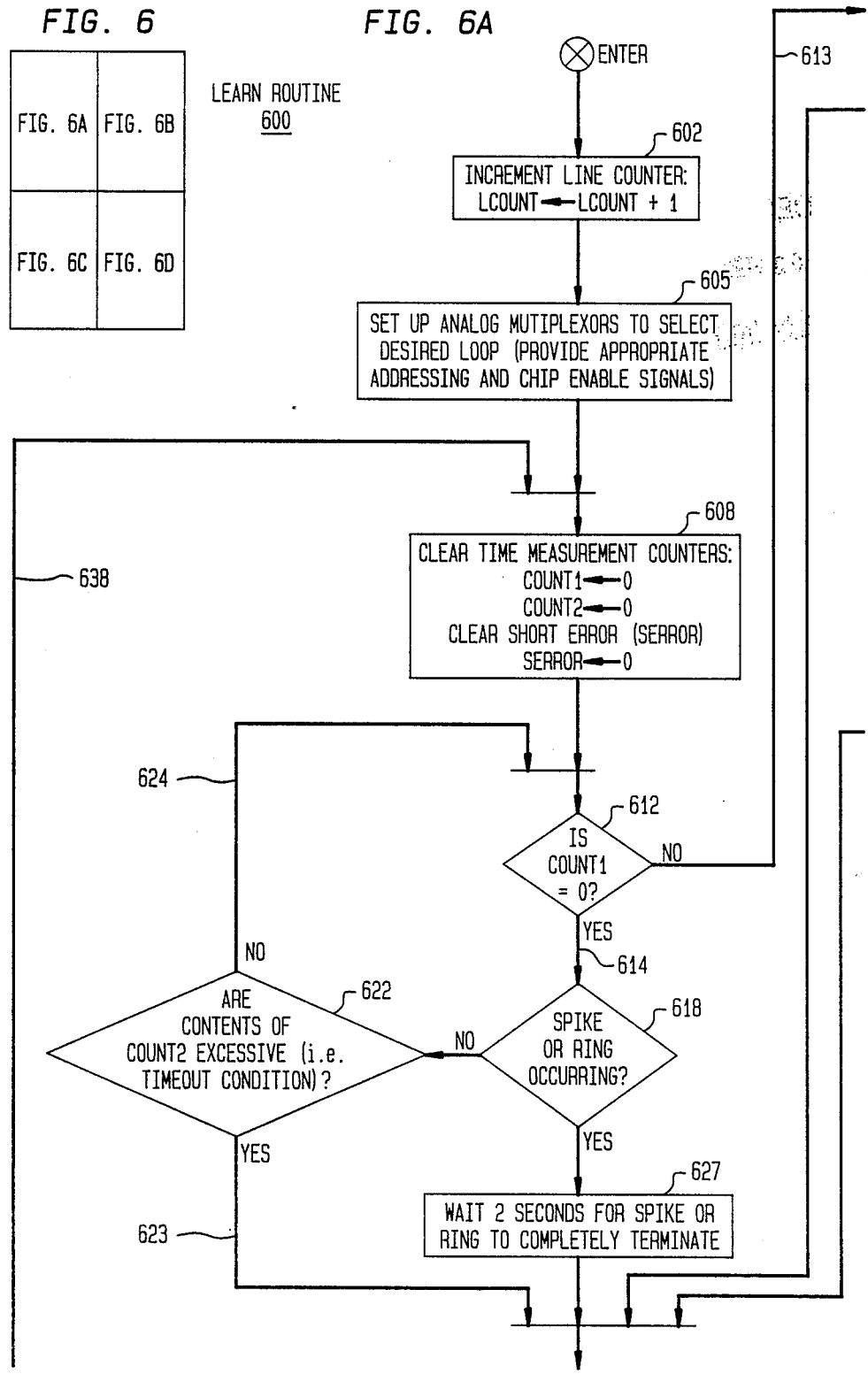

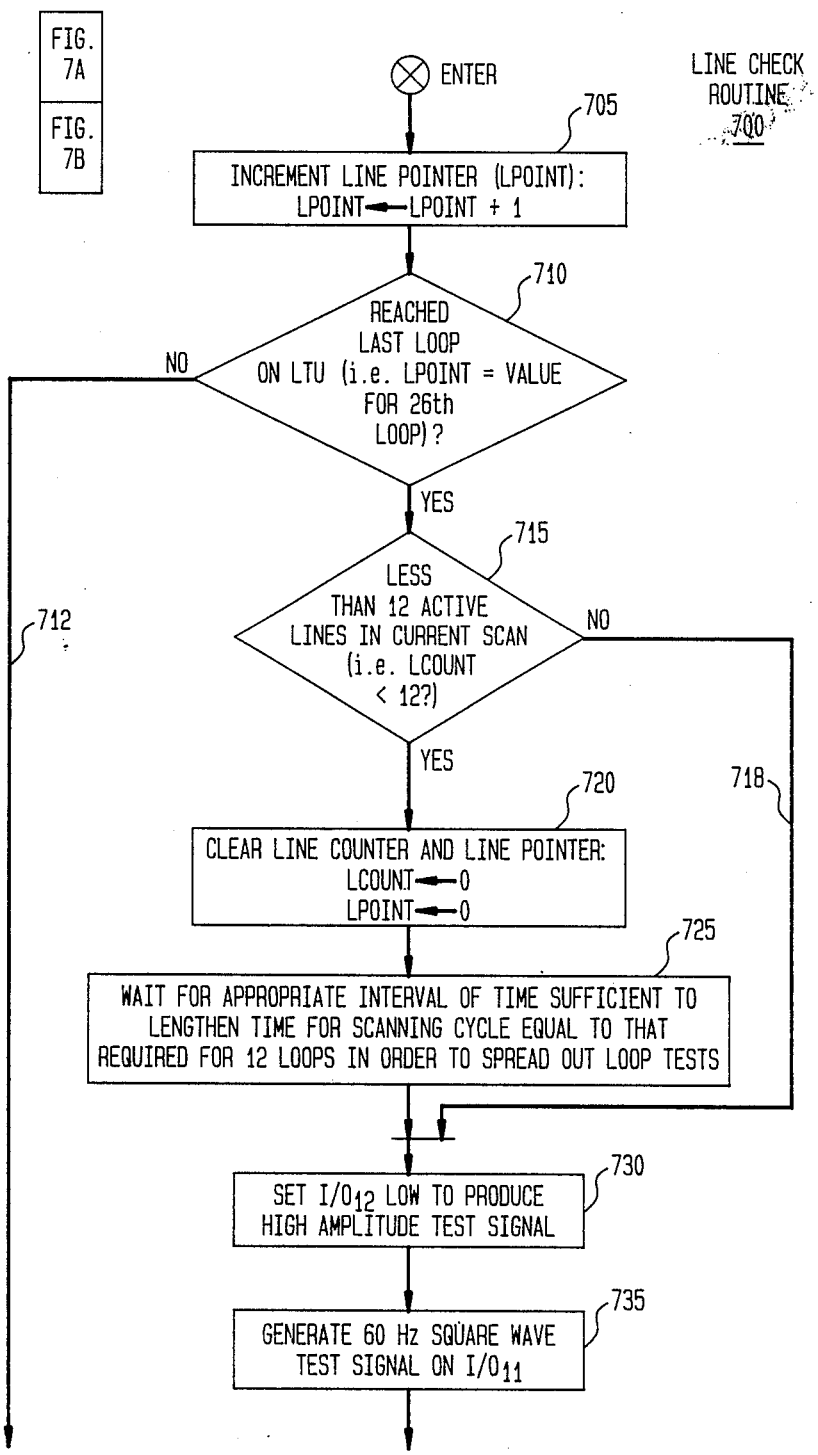

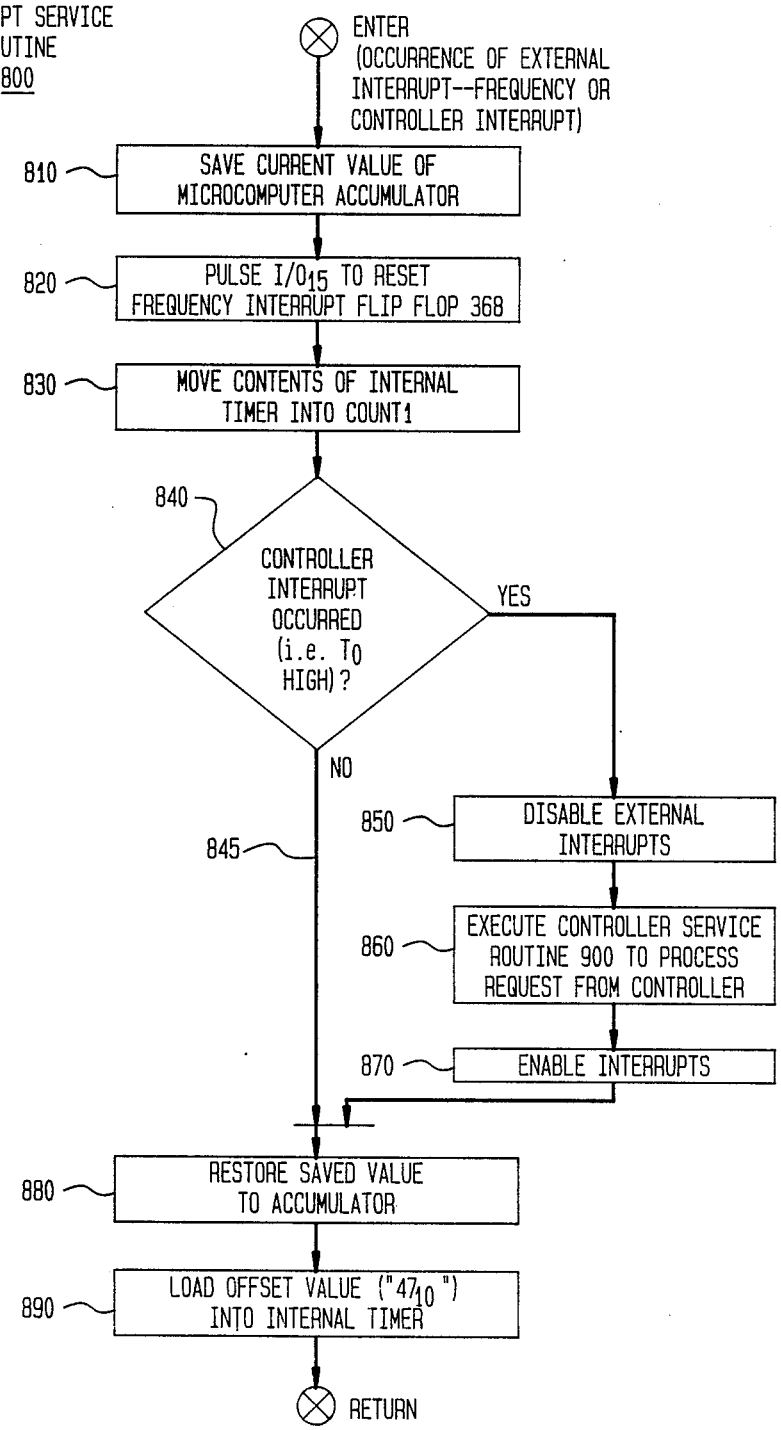

CONTROLLER SERVICE ROUTINE 900

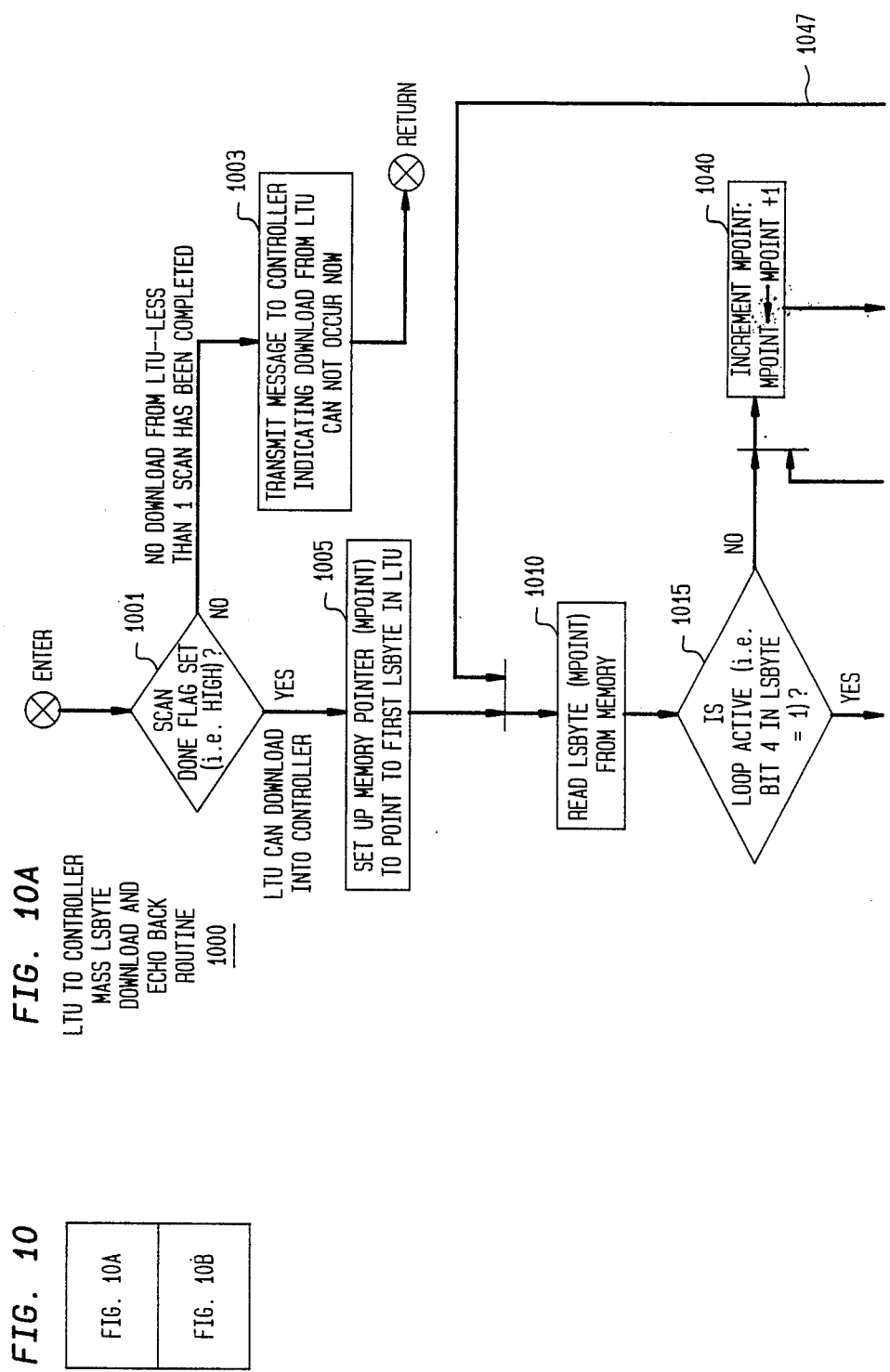

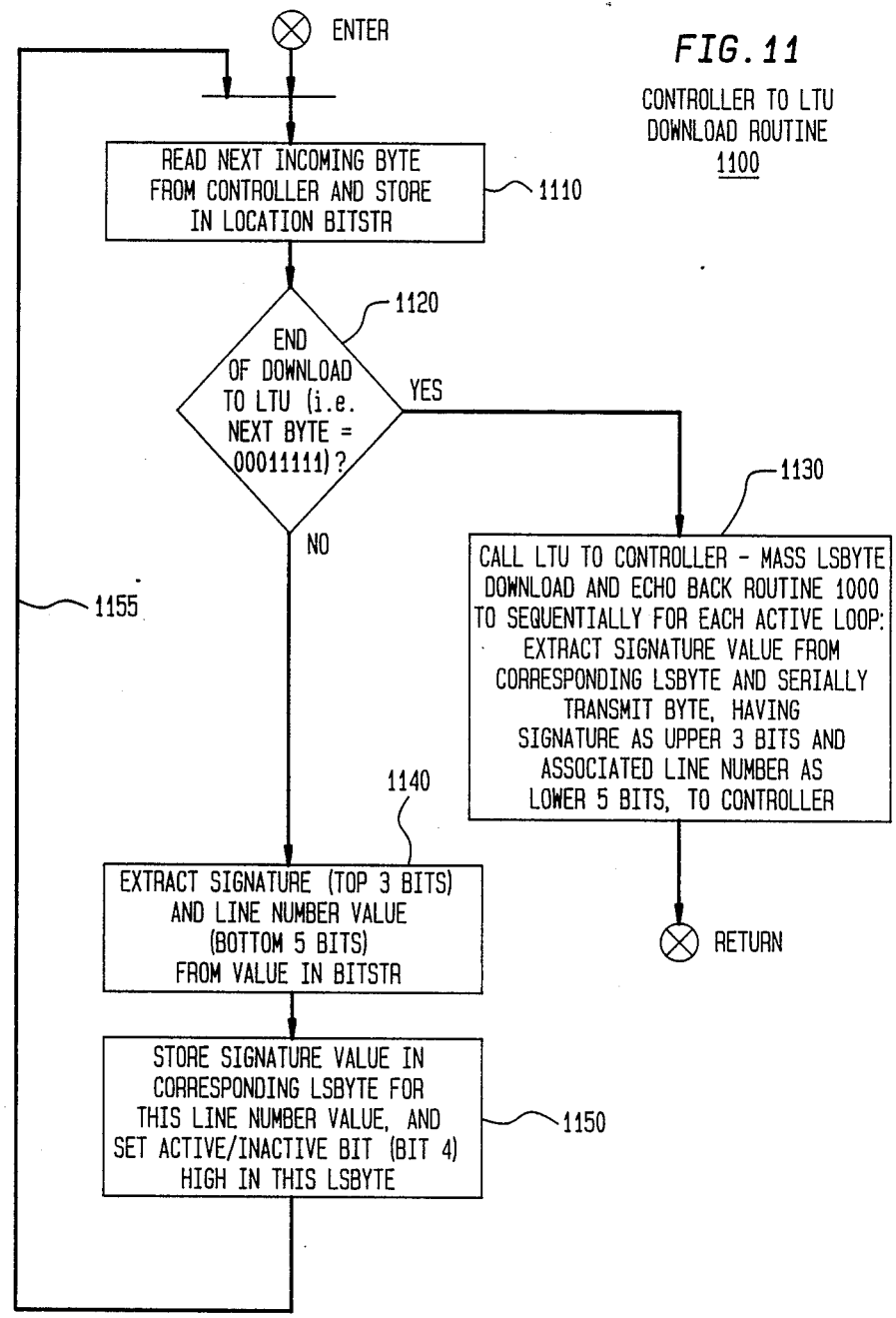

ANALOG TEST STATUS ROUTINE
1200

TIMER INTERRUPT ROUTINE
1300

LOOP STATUS VERIFICATION SYSTEM

CROSS-REFERENCE TO RELATED APPLICATION

This application is a continuation-in-part patent application of our co-pending U.S. patent application Ser. No. 07/222,087, filed July 20, 1988 and entitled "LOOP STATUS VERIFICATION SYSTEM" now U.S. Pat. No. 4,864,598.

BACKGROUND OF THE INVENTION

1. Field of the Invention

The invention relates to a system for verifying the integrity of each one of a number of communication paths, illustratively telephone subscriber loops, that runs between a telephone company central office ("near end") location and a corresponding remote ("far end") location.

2. Description of the Prior Art

Frequently, a need arises in many applications for a highly reliable continuously operational communication path. Such applications include for example remote premise monitoring, data transmission and emergency communications. Because of the inherent reliability and widespread availability of telephone service, telephone lines, whether dedicated or dial-up, are being increasingly used to provide these communication paths.

One such application involves remote premise monitoring. Here, a remote premise, such as for example a residence, a business office or an unmanned site situated at a remote location, is outfitted with an electronic monitoring system that contains sensor(s) to detect the occurrence of one or more specific alarm conditions, e.g. fire, smoke, high temperature, intrusion, flooding or malfunction of a specific machine. These sensors are connected to monitoring circuitry that frequently contains an automatic telephone dialer. The dialer is connected through a subscriber loop (line) to a telephone company central office. At an occurrence of an alarm condition, the automatic dialer goes off-hook and through the subscriber loop dials the telephone number of an alarm company. After a telephone connection has been established between the central office and appropriate receiving equipment at an alarm company, the monitoring circuitry sends a message to the receiving equipment. This message contains the location of the monitored premises and the specific alarm condition that occurred thereat. An individual at the alarm company interprets the message and then dispatches appropriate assistance, if needed, to that location.

The reliability of a telephonic based remote premise monitoring system depends in good measure upon the integrity of a subscriber line (loop). For example, various systems known in the art that rely on the use of dial-up lines can be thwarted if a subscriber loop connecting the monitored premise with the telephone company central office is severed or if the loop breaks. Specifically, inasmuch as these prior art systems do not detect the occurrence of any interruption in the integrity of the subscriber loop, the receiving equipment typically remains unaware of it. Moreover, for reasons of cost and/or complexity, these prior art remote monitoring systems frequently do not contain back-up communication equipment, e.g. a radio link, that activates upon the failure of a primary communications link, e.g. a telephone line. As such, once the subscriber loop connection between the monitoring equipment and the telephone company central office is lost, the monitoring equipment becomes substantially unable to communicate the occurrence of an alarm condition to the alarm company. Hence, the remote premises become substantially unprotected.

Therefore, in telephonic based remote monitoring systems, a critical need exists to continuously monitor the integrity of subscriber loops that connect monitored premises to a telephone company central office and to provide notification of any loss of integrity.

One prior art remote alarm monitoring system that attempts to verify subscriber loop integrity is disclosed in U.S. Pat. No. 4,528,423 (issued to R. T. James et al on July 9, 1985 and hereinafter referred to as the '423 patent) and U.S. Pat. No. 4,442,320 (issued to R. T. James et al on Apr. 10, 1984 and hereinafter referred to as the '320 patent). Here, this system relies on a scanner preferably located at a telephone company central office that periodically interrogates the status of a number of remotely located subscriber terminal units through corresponding subscriber loops. Each subscriber terminal unit is located at a remote location and is connected to various sensors for monitoring certain alarm conditions thereat. If a non-alarm state exists at a location, the terminal unit situated thereat continuously transmits a corresponding sub-audible low frequency tone, approximately 25 Hz, over its corresponding subscriber loop. However, no such tone is generated if the terminal unit detects an alarm condition. Any interruption in the low frequency tone whether caused by an actual alarm condition detected by the terminal unit or a break in the subscriber loop is detected by the scanner as an alarm condition. In response to this occurrence, the scanner interrogates the terminal unit by emitting relatively high frequency FSK (frequency shift keyed) signals over the subscriber loop. The terminal unit replies again, if it can, using relatively high frequency FSK signaling, to provide the cause of the alarm. Thereafter, the scanner provides appropriate notification of any alarm condition so that proper corrective action can be undertaken.

Another prior art remote monitoring alarm system that attempts to verify subscriber loop integrity is disclosed in U.S. Pat. No. 3,930,246 (issued to S. V. Campbell on Dec. 30, 1975 and hereinafter referred to as the '246 patent). Here, circuitry located at a central station transmits a 3 kHz tone during a test interval over a telephone line to a remote station. Line integrity monitoring circuitry at a remote station receives this tone, divides it in half and transmits a resulting 1.5 kHz tone back over the telephone line to the central station. Upon receiving the 1.5 kHz tone, the central station ceases transmission of the 3 kHz tone until the next successive test cycle. If the 1.5 kHz tone is received within a prescribed period of time, which is sufficiently long to account for propagation delays and the like, then the telephone line is assumed to be operating satisfactorily. Alternatively, if the 1.5 kHz tone is not received, then the 3 kHz tone will remain on for longer than the prescribed period; in which case, the line is assumed to be broken and a suitable alarm is activated.

Unfortunately, these prior art systems possess a number of drawbacks that limit their utility. First, a subscriber loop can exist in two states: either off-hook and on-hook. The voltage on the loop changes dramatically between an on-hook condition, where the voltage and loop impedance are both relatively high, to an off-hook condition when the telephone is essentially shorting out the line and both the loop impedance and loop voltage are consequently relatively low. If the level of the tone is set to a particular level for an off-hook condition, as it frequently is, then whenever the line goes on-hook the level of the tone as it appears on the loop will increase substantially. This, in turn, frequently causes cross talk in other subscriber loops located in the telephone company central office. Alternatively, if the voltage of the tone is set to a particular level for an on-hook condition, then whenever the loop goes off-hook, the loop impedance decreases substantially thereby dramatically attenuating the level of the tone. As a result, the tone becomes quite difficult to detect at the telephone company central office. In addition, the presence of a very high level tone on the loop as it goes on-hook may imitate a telephone company signalling or transmission frequency and thereby disadvantageously cause equipment connected to a subscriber side of the loop to incorrectly assume that the loop is still off-hook when in fact it is not.

Second, use of single tones for subscriber loop verification purposes often does not provide sufficient security against tampering. In particular, a person, possessing some skill in electronics and interested in thwarting the remote monitoring system, could with rudimentary test equipment determine the frequency of the tone. Once the frequency is known, that person could duplicate the tone using a relatively simple signal generator. Having done this, the person could terminate the loop with the generator and then sever the remainder of the subscriber loop leading to the remote premise and its associated subscriber unit thereby effectively isolating the remote monitoring equipment from the telephone company central office and hence from the receiving equipment at the alarm company. This, in turn, disadvantageously negates the protection provided by the monitoring system to the remote premise. Furthermore, apart from the relative ease of single tone duplication, use of identical subscriber units also degrades security. Specifically, if every subscriber unit used a tone of the same frequency, then a person could readily terminate a subscriber loop with a separate subscriber unit and then sever the subscriber loop leading into the remote premise thereby effectively isolating the remote premise from the receiving equipment located at the alarm company. Since this disconnection would not be detected at the alarm company, its occurrence would likely negate any protection provided by the monitoring system to the remote premise.

Lastly, remote monitoring systems, particularly those shown in '423 and '320 patents, that have subscriber loop verification capabilities tend to be complex and rather expensive to implement.

Thus, a need exists in the art for a relatively simple and inexpensive subscriber loop verification system for verifying the integrity of each one of a number of subscriber loops that runs between a telephone company central office and a corresponding remote location. This system should provide a relatively high degree of security against tampering and, if tones are used, use a tone voltage level that does not cause cross talk onto other subscriber loops at the central office or imitate a telephone company signalling or transmission frequency to equipment connected to the subscriber side of a loop being verified whenever that loop goes on-hook. In addition, the tone should not be difficult to detect at the telephone company central office whenever the loop being verified goes off-hook.

SUMMARY OF THE INVENTION

Accordingly, an object of the present invention is to provide a subscriber loop verification system that is capable of verifying the integrity of each one of a number of subscriber loops that runs between a telephone company central office and a corresponding remote location.

A specific object is to provide such a system that provides a relatively high degree of security against tampering.

Another specific object is to provide such a system that uses a tone voltage that imparts minimal, if any, cross talk onto other subscriber loops located at the telephone company central office whenever the loop being verified goes on-hook.

Another specific object is to provide a system that uses a tone voltage that does not substantially imitate a telephone company signalling or transmission frequency to equipment situated at the remote end of a loop being verified whenever that loop goes on-hook.

Another specific object is to provide such a system that uses a tone voltage that is not difficult to detect at the telephone company central office whenever the line being verified goes off-hook.

These and other objects are accomplished in accordance with the teachings of the present invention by a system for verifying the integrity of a communication path that connects near end and far end locations, in which the system has: means connected to the communication path for monitoring a characteristic of the path detectable at the far end thereof and for injecting a pre-defined test signal onto the path in the event the monitored characteristic indicates normal operation of the path, wherein the test signal is substantially transparent to communication that will be carried over the path; means connected to the path at the near end for detecting whether the pre-defined test signal appears thereon and for providing a control signal corresponding thereto; means located at the near end and responsive to the control signal for producing an appropriate notification if the pre-defined test signal is absent from the path or does not match a prescribed test signal that is expected to appear on the path.

In accordance with specific embodiments of the invention designed for use in telephone based remote premise monitoring systems: the inventive system utilizes a loop verification module (LVM) that is located at each customer premise and is placed in series between a subscriber loop running to that premise and all remaining customer premise equipment located thereat and connected thereto. The LVM can itself take on one of two illustrative embodiments. In the first embodiment, the LVM monitors the on-hook and off-hook condition of the loop detectable at its corresponding remote ("far end") location and continuously transmits a programmed one of several sub-audible tones (i.e. a "test" signal) thereover to indicate normal operation of the loop thereat. A sub-audible tone, ranging between 32.8 and 37.5 Hz, is preferably used inasmuch as this tone is substantially transparent to normal telephone company signalling and transmission frequencies (the latter being either voice or data in the band limited range of approximately 300–3000 Hz) that would typically appear on the loop and therefore does not adversely affect normal operation of the loop to any appreciable degree. The LVM ceases to transmit this tone whenever it detects an abnormal off-hook condition. In its second embodiment, the LVM, again connected at a far end of a subscriber loop, merely transmits the programmed sub-audible tone continuously onto the loop. This LVM does not terminate transmission of the tone whenever the loop operates abnormally. Nonetheless, both embodiments of the LVM automatically adjust the level of the tone such that the tone, as it appears on a subscriber loop to which that LVM is connected, maintains an approximately constant amplitude, e.g. at $-14$ dbm$\pm 5$ dbm @600$\Omega$, regardless of whether that subscriber loop is in an on- or off-hook condition. Central office loop monitoring circuitry, specifically one or more line test units (LTUs) and a controller, continually and sequentially scans all the loops to detect any loss of or unexpected change in the tone produced by any LVM connected to any of these loops. Any detected cessation in the tone or detected incorrect frequency of the tone results in the central office monitoring circuitry notifying the alarm company which, in turn, can immediately investigate the current loss of loop integrity and dispatch appropriate assistance to the remote premise, if necessary. For any newly installed LVM, the associated LTU that scans the subscriber loop to which that LVM is connected, first "learns" the frequency to which that LVM has been programmed and, once this successfully occurs, sequentially and periodically scans this loop to detect a frequency change or cessation in the "learned" programmed tone that is being produced by this LVM.

In accordance with a feature of the invention, the inventive system provides two level verification of loop integrity: first, by detecting the presence of a transmitted tone at the telephone company central office ("near end") location, the system verifies that the loop over which the tone was transmitted is itself physically continuous; and, second, by determining that the detected tone has the proper frequency, the system verifies that the loop is properly functioning in an off-hook state at its remote ("far end") location.

BRIEF DESCRIPTION OF THE DRAWING

The teachings of the present invention may be clearly understood by considering the following detailed description in conjunction with the accompanying drawing, in which:

FIG. 1 is a diagram showing the proper alignment of the drawing sheets for FIGS. 1A and 1B;

FIGS. 1A and 1B collectively depict a block diagram of a preferred embodiment of inventive loop status verification system 10;

FIG. 3 is a diagram showing the proper alignment of the drawing sheets for FIGS. 3A-3C;

FIGS. 3A-3C collectively depict a block diagram of a representative line test unit (LTU) used in the inventive system, specifically LTU $34_1$ shown in FIG. 1A and 1B;

FIG. 5 is a diagram showing the proper alignment of the drawing sheets for FIGS. 5A-5C;

FIGS. 5A-5C collectively depict a flowchart of Loop Status Verification Routine 500 that is executed as part of Main Loop 400;

FIG. 6 is a diagram showing the proper alignment of the drawing sheets for FIGS. 6A-6D;

FIGS. 6A-6D collectively depict a flowchart of Learn Routine 600 that is also executed as part of Main Loop 400;

FIG. 7 is a diagram showing the proper alignment of the drawing sheets for FIGS. 7A and 7B;

FIGS. 7A and 7B collectively depict a flowchart of Line Check Routine 700 that is also executed as part of Main Loop 400;

FIG. 8 depicts a flowchart of Interrupt Service Routine 800 that is executed by microcomputer 370 whenever an external interrupt occurs;

FIG. 10 is a diagram showing the proper alignment of the drawing sheets for FIGS. 10A and 10B;

FIGS. 10A and 10B collectively depict a flowchart of LTU to Controller Mass LSBYTE Download and Echo Back Routine 1000 that is executed as part of Controller Service Routine 900;

FIG. 11 depicts a flowchart of Controller to LTU Download Routine 1100 that is also executed as part of Controller Service Routine 900;

To facilitate understanding, identical reference numerals have been used, where possible, in the drawing to denote elements that are common to the figures.

DETAILED DESCRIPTION

After reading the following description, those skilled in the art will clearly realize that the inventive system can be used to verify the integrity of any one of a number of separate critical end-to-end communication paths in a communication system. Such a system could rely on use of physical wire links, such as telephone subscriber loops (lines), or use non-wire links, such as radio, microwave, optical, ultrasonic or other forms of communication links, provided that, as discussed below, a pre-defined test signal which is substantially transparent to normal communication (e.g. signalling and transmission frequencies that would occur over each link being verified) can be continuously imparted to the link being used. In telephony, a critical need exists in wide variety of applications for continuously operating subscriber loops that run between a telephone company central office (or "near end" location) and corresponding remote (or "far end") locations. Hence, for purposes of brevity, the inventive system will be described in the context of a loop status verification system that would typically be used by an alarm company to verify the integrity of a number of individual subscriber loops that connect a telephone company central office to separate corresponding remotely located monitored premises.

A. OVERALL SYSTEM DESCRIPTION

Figure 1B:
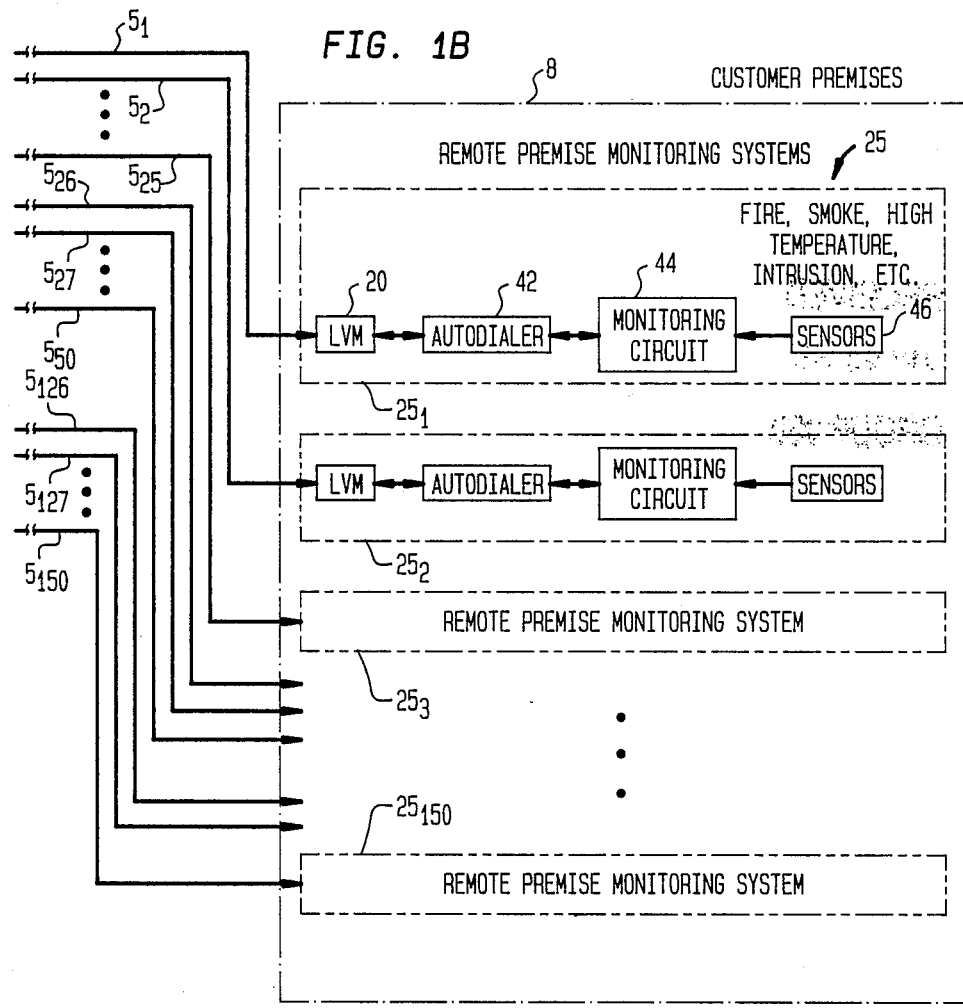

A block diagram of a preferred embodiment of inventive loop status verification system 10 is collectively depicted in FIGS. 1A and 1B; for which the proper alignment of the drawing sheets for these figures is shown in FIG. 1.

As shown, system 10 is formed of two basic elements: central office loop monitoring circuitry 30 that is bridged across a number of two-wire subscriber loops (lines) 5 and a loop verification module (LVM), such as LVM 20, located at a corresponding customer premise and connected to a customer end of each of subscriber loops 5, such as loop $5_1$, that is to be verified. Each subscriber loop forms part of the "outside plant" of a local telephone company and is used to connect main distribution frame 6 located in the telephone company central office with a particular customer premise. The subscriber loop is connected through the LVM to customer premise equipment located at that premise.

In remote monitoring applications, a single alarm company will typically monitor a group of such premises, collectively shown as customer premises 8. Each of these premises will be equipped with a remote premise monitoring system, such as remote premise monitoring system $25_1$, which detects the occurrence of any one of several pre-defined conditions, such as illustratively fire, smoke, high temperature, intrusion, and possibly others, that might occur at that remote premise. Inasmuch as all of these monitoring systems are, at a high level, essentially identical, the following discussion of these systems will only address remote monitoring system $25_1$. As shown, system $25_1$ contains autodialer 42, monitoring circuit 44 and sensors 46. Sensors 46 are well known and are used to detect each of the pre-defined conditions. The outputs of all the sensors are connected to monitoring circuit 44 which, at the occurrence of a detected condition, suitably activates autodialer 42 to seize the subscriber loop to which it is connected, i.e. go off-hook, then dial the telephone number of the alarm company and finally transmit to receiving equipment situated at the alarm company a pre-defined voice (or data) message that specifies the location of the monitored premise and the nature of the detected condition. In response to this message, the alarm company will dispatch appropriate assisting personnel, e.g. fire, police or others, to the remote premise.

In many commercially available remote premise monitoring systems known in the art, the output of the autodialer is connected directly to the customer end of the subscriber loop. Such a connection carries a heavy security risk. Specifically, with such a system, the alarm company does not detect the occurrence of any interruption in the integrity of the loop but rather assumes that the subscriber loop will always be operable. As such, the receiving equipment at the alarm company frequently remains totally unaware of any interruption of telephone service to the remote premise. Moreover, for reasons of cost and/or complexity, commercially available remote monitoring systems known in the art frequently do not contain back-up communication equipment, e.g. a radio link, that activates upon the failure of a primary communications link, e.g. a telephone line. As such, once the connection provided by the subscriber loop between the remote premise monitoring equipment and the telephone company central office is lost for any reason, the monitoring equipment becomes substantially unable to communicate the occurrence of an alarm condition to the alarm company. Hence, the remote premise becomes essentially unprotected. Specifically, if the output of autodialer 42 were to be connected directly to subscriber loop $5_1$ and then this loop were to be severed by a burglar, the remote premise would lose telephone service and hence the autodialer would be totally unable to dial into the alarm company. Inasmuch as the integrity of subscriber loop $5_1$ is not tested, this loss of service would generally go completely undetected and thereby totally defeat any protection afforded by the remote premise monitoring system to the monitored premise.

To impart a substantially increased degree of security to a remote premise monitoring system, the inventive system continually verifies the integrity of every subscriber loop employed therein. Specifically, in accordance with the specific teachings of the present invention, the inventive system utilizes a loop verification module (LVM), such as LVM 20, that is located at each customer premise and is placed in series between the subscriber loop running to that premise and all remaining customer premise equipment located thereat and connected thereto. To facilitate installation and for reasons of security, this module would typically be mounted within a remote premise monitoring system. Each LVM monitors the on- and off-hook condition of the loop detectable at its corresponding remote ("far end") location and transmits a programmed one of several sub-audible tones (i.e. a "test" signal) thereover. A sub-audible tone, ranging between 32.8 and 37.5 Hz, is preferably used inasmuch as this tone is substantially transparent to normal telephone company signalling and transmission frequencies (the latter being either voice or data in the band limited range of approximately 300–3000 Hz) that would typically appear on the loop and therefore does not adversely affect normal operation of the loop to any appreciable degree. Clearly, for use in communication systems that rely on communication paths other than two-wire subscriber loops, any other tone, sub-audible or otherwise, could be used provided that this tone remains substantially transparent to communication frequencies that would normally occur on this path. The LVM, in one embodiment, i.e. LVM 28 shown in FIG. 2 and discussed in detail below, monitors the on-hook and off-hook condition of the subscriber loop to which it is connected and, in response thereto, continuously transmits the programmed tone as long as the loop is operating normally so as to indicate normal operation thereof. Once this LVM detects an abnormality in the loop, it ceases to transmit the tone for the duration of the abnormality. In contrast, the second embodiment of the LVM, i.e. LVM 1400 shown in FIG. 14 and discussed in detail below, merely transmits the programmed tone continuously onto the loop regardless of the state of the loop. In any case, with either embodiment of the LVM, central office loop monitoring circuitry 30, shown in FIGS. 1A and 1B, continually and sequentially scans all the loops to detect any loss of or unexpected change in the tone produced by any LVM connected to any of these loops. Any detected cessation in the tone or detected incorrect frequency of the tone results in circuitry 30 notifying the alarm company which, in turn, can immediately investigate the current loss of loop integrity and dispatch appropriate assistance to the remote premise, if necessary. Through the inventive system, verification of loop integrity occurs at two levels: first, detecting the presence of a transmitted tone at the telephone company central office ("near end") location verifies that the loop over which the tone was transmitted is itself physically continuous; and, second, determining that the detected tone has the proper frequency verifies that the loop is properly functioning at its remote ("far end") location.

Specifically, circuitry 30 contains one or more line test unit (LTUs) 34, such as LTU $34_1, 34_2, \ldots, 34_6$, controller 32 and modems 36, illustratively formed of separate modems $36_1, 36_2$ and $36_3$. Each of these LTUs is bridged across a number of separate subscriber loops, typically twenty five or less in number, such as loops $5_1, 5_2, \ldots, 5_{25}$ for LTU $34_1$, loops $5_{26}, 5_{27}, \ldots, 5_{50}$ for LTU $34_2$ and loops $5_{126}, 5_{127}, \ldots, 5_{150}$ for LTU $34_6$. All of these loops collectively form subscriber loops 5. Each LTU continuously and sequentially scans each of the loops connected to it and determines whether the LVM connected to that loop is transmitting a tone of the proper frequency. In this manner, the LTU is able to continuously verify the integrity of each subscriber loop connected to it. To report the integrity of the loops, each LTU is connected to controller 32. Up to eight separate LTUs can be placed into one rack which can be separately addressed by the controller. At present, the inventive system can accommodate up to five separate racks. The controller occupies two slots on one rack thereby limiting the number of LTUs in that rack, illustratively LTUs $34_1, 34_2, \ldots, 34_6$, to six. The inventive system has the capability of verifying up to 950 separate subscriber loops emanating from one telephone company central office. The rack with the controller and six LTUs handles 150 separate loops, while each of four expansion racks (for a total of five racks) handles 200 separate additional loops using eight separate LTUs. Since all LTUs are identical and to simplify the following discussion, only one rack of LTUs, specifically LTUs $34_1, 34_2, \ldots, 34_6$, will be discussed with only LTU $34_1$ being discussed in detail later.

To transfer loop status information, as discussed below, from any LTU to the controller as well as download information for each active loop from the controller to the LTUs, also discussed in detail below, serial communication occurs between controller 32 and each one of LTUs 34. To facilitate this communication, each LTU is connected in parallel to controller 32 through leads 35 which carry serial messages from the controller to any LTU over lead $35_1$ and from any LTU to controller 32 over lead $35_2$. Each rack of LTUs is separately addressable by an appropriate level being applied to a separate corresponding rack enable lead $37_1, 37_2, \ldots,$ or $37_6$ that collectively form rack enable leads 37. Each of these rack enable leads is connected to all the LTUs situated in a specific corresponding physical mounting rack. Specifically, rack enable lead $37_1$ is connected to the rack enable inputs of LTUs $34_1, 34_2, \ldots, 34_6$ which are all located in the first rack (not shown). Rack enable leads $37_2$ and $37_3$ are connected to other racks of LTUs (not shown). Within any rack, a particular LTU can be addressed by appropriate signals being applied by the controller to address leads 38 that are connected to the address inputs of every LTU in the system. Each LTU situated within each rack has a separate unique internal three bit hardwired address. As such, the controller can address any individual LTU by first applying an enable signal to the appropriate rack enable lead and then applying an appropriate address to address leads 38.

As shown, three modems $36_1, 36_2$ and $36_3$ are connected to controller 32 through separate serial I/O ports. These modems allow the alarm company and the local telephone company to communicate with the controller. One such modem, such as modem $36_1$, is dedicated to providing dial out capability to controller 32. The controller contains internal database 55 that maintains a current table which for each loop contains the loop number as used in the inventive system (i.e. loop 1, 2 and the like), the physical line number associated with that loop as it appears on main distribution frame 6, the location of the premise to which that loop is connected and an associated telephone number of an alarm company that is responsible for monitoring that premise. Upon receipt of loop failure information from an LTU, controller 32 performs a database access operation into database 55 to obtain the address of the premise and the corresponding alarm company telephone number and then appropriately instructs modem $36_1$, if it is not busy, to dial out to that number. Once a telephone connection is established, controller 32 transmits an appropriate message to that alarm company to notify it of the loop failure and the location of the monitored premise. Modem $36_2$ provides the local telephone company with dial in capability to communicate with controller 32 and thereby load appropriate information into database 55, such as the physical line numbers of the loops that are to be monitored and their corresponding actual telephone numbers as well as to instruct the controller to "enable" a loop. Modem $36_3$ permits an alarm company to dial in to controller 32 and thereby load information, such as account numbers and the alarm company telephone number, into database 55, receive loop status verification information from the controller and instruct the controller to begin (activate) or cease monitoring (deactivate) any particular loop. Now, to initiate verification of any loop, the local telephone company will first "ready" a loop for service and then dial into the controller through modem $36_2$ and instruct it to enable the loop. This, in turn, permits an alarm company to subsequently activate the loop. Hence, once the loop has been enabled, the alarm company will then physically install an LVM at the far end of the loop and thereafter dial into the controller through modem $36_3$ to instruct the controller to activate the loop. Later, if a loop failure is detected and modem $36_1$ is busy, controller 32 will terminate any communication occurring on modem $36_2$ or $36_3$ and then instruct either of these modems to dial an alarm company and then transmit an appropriate message thereto.

B. DETAILED HARDWARE DESCRIPTION

1. Loop Verification Module (LVM)

Figure 2:
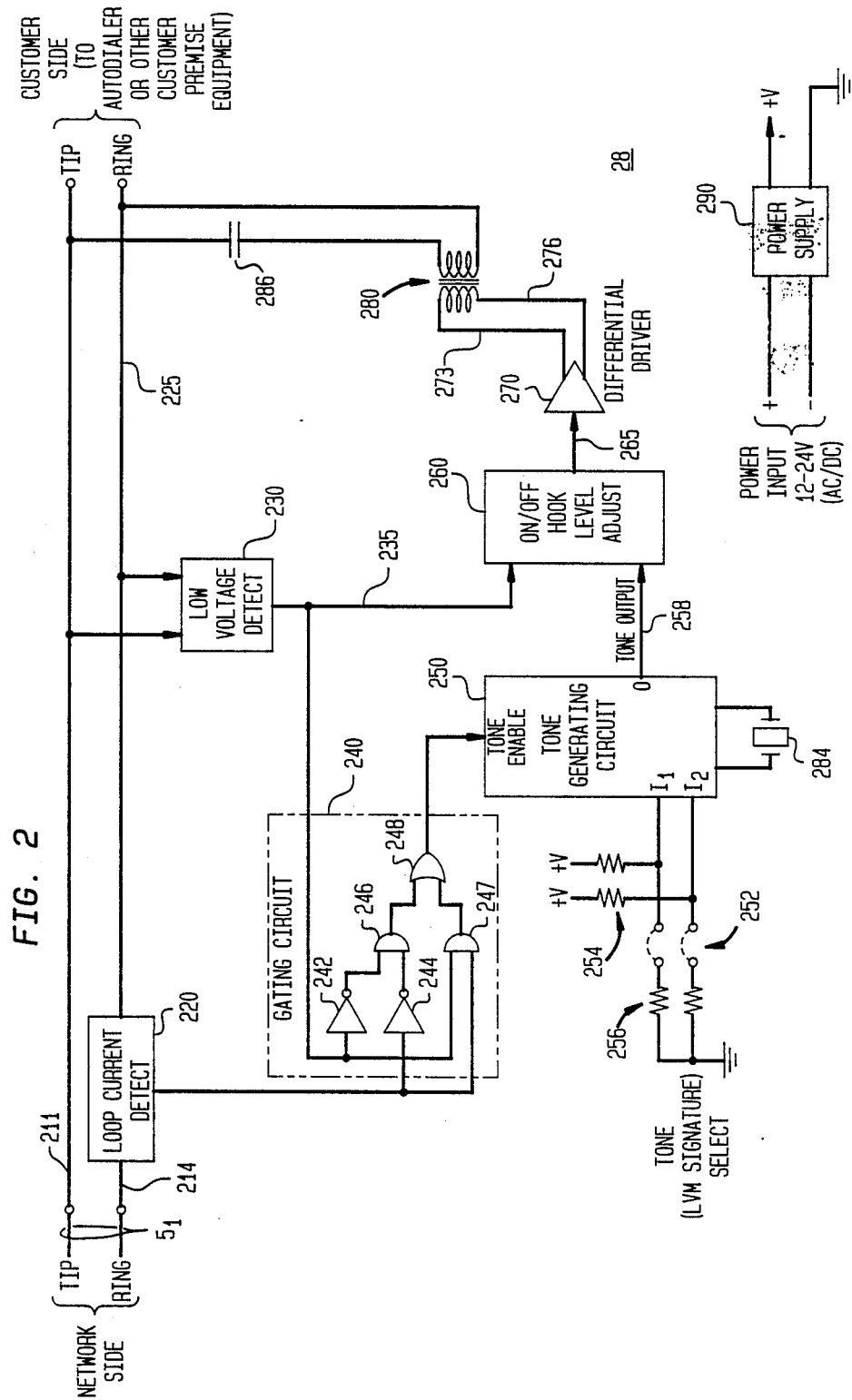
FIG. 2 is a block diagram of a first embodiment of a representative loop verification module (LVM), i.e. LVM 28, which can be used for illustratively LVM 20 that forms part of the inventive system shown in FIGS. 1A and 1B.

FIG. 2 depicts a block diagram of a first embodiment of an LVM, specifically LVM 28, that can be used for illustratively LVM 20 shown in FIGS. 1A and 1B. As discussed above, if the subscriber loop, specifically loop $5_1$, to which this module is connected is functioning properly, the module applies a pre-defined sub-audible tone at a selected one of four different frequencies onto the loop. A cessation in the presence of this tone or a change in its frequency is interpreted by the LTU that scans this loop as a loop failure. Such a cessation can be caused by a severance of this loop or an off-hook condition occurring as the result of someone tampering with the loop at any place between the telephone company central office and the LVM. Detecting such an off-hook condition advantageously imparts added security to the inventive loop verification system.

Specifically, as shown in FIG. 2, two-wire subscriber loop $5_1$ is connected via appropriate input terminals to leads 211 and 214. Loop current detect circuit 220 is placed in series with a ring side of the subscriber loop and detects whether an appropriate level of loop current flows through the subscriber loop. The resulting ring side of the loop emanating from circuit 220 is connected to ring lead 225 and, in conjunction with the tip side appearing on lead 211, becomes the subscriber loop that is connected to autodialer 42 (see FIGS. 1A and 1B) or other customer premise equipment for applications other than remote premise monitoring, existing at the remote premise. Low voltage detect circuit 230, as shown in FIG. 2, is connected across tip lead 211 and ring lead 225 and detects whether the voltage on the subscriber loop is in either a high or low state respectively indicative of an on-hook or off-hook condition. Through these detectors, an off-hook condition occurring anywhere on the loop between the telephone company central office and the LVM can be detected. Specifically, such an off-hook condition is characterized by a low loop voltage but essentially no loop current. In this case, the loop current was essentially shunted across the loop at the location the loop went off-hook. In a properly functioning subscriber loop, the loop would go off-hook at the subscriber side of the LVM, in which case, the loop current would be relatively large while the loop voltage (and loop impedance) would be relatively low. In addition, in a properly functioning loop in an on-hook condition, the loop current would be essentially zero while the loop voltage (and loop impedance) would be relatively high. Loop current detect circuit 220 produces a high level whenever an appropriately large amount of current flows through the loop. Low voltage detect circuit 230 produces a high level whenever the loop voltage is relatively low. The outputs of both of these detect circuits are applied to gating circuit 240. This circuit generates an enable signal to tone generating circuit 250 to cause the latter to generate a tone of a specific programmed frequency. In order to enable circuit 250 to generate a tone under proper on- and off-hook conditions, gating circuit 240 produces a high level whenever the outputs of the loop current detect and low voltage detect circuits are either both high or both low, thereby indicative of either a proper off-hook (low loop voltage and high loop current) or on-hook (high loop voltage and low loop current) condition. Gating circuit 240 contains inverters 242, 244, AND gates 246 and 247, and OR gate 248. AND gate 247, being directly connected to the outputs of detect circuits 220 and 230, produces a high output whenever loop $5_1$ is in a proper on-hook condition. Inasmuch as the outputs of these two detect circuits are inverted by inverters 242 and 244 before being applied to respective inputs of AND gate 246, this AND gate detects a proper off-hook condition. The output of AND gates 246 and 247 are applied to separate inputs of OR gate 248 which, in turn, produces a high level during either of these two proper on-hook and off-hook conditions.

Circuit 250 can be programmed to generate a tone at one of four specific frequencies: 32.8, 34.1, 36.2 or 37.5 Hz. This circuit is an integrated circuit number 35064 (commonly referred to as "BETTY" by Keptel) that is currently manufactured for and used by Keptel, Inc. which is located in Tinton Falls, New Jersey and is the present assignee of this application. The specific frequency produced by this circuit is set by placing high or low voltage levels at input pins $I_1$ and $I_2$ of this circuit. Here, the specific tone is hardwire programmed during installation of the LVM at the remote premise by installing none, one or both of jumpers 252 to either place a low level through resistors 256 at a corresponding one or both of these pins or allowing the voltage at the pin(s) to be pulled up to a high level, i.e. +V, by resistors 254. Crystal 284 appropriately sets the clock frequency of tone generating circuit 250.

The output tone provided by circuit 250 is routed by lead 258 as an input to on/off hook level adjust circuit 260. This circuit in response to the output of voltage level detect circuit 230 which appears on lead 235 varies the amplitude of the tone such that it remains at approximately $-14$ dbm$\pm 5$ dbm@600$\Omega$ on the loop regardless of whether the loop is in an on- or off-hook condition. The output of on/off hook level adjust circuit 260 is routed, via lead 265, to differential driver 270 which converts the single ended output into a differential output with a sufficiently high level to drive coupling transformer 280. This transformer inductively couples the generated tone to the loop. Specifically, the primary of this transformer is connected via leads 273 and 276 to the outputs of differential driver 270. The secondary leads of this transformer are connected to the ring side of the loop and, via capacitor 286, to the tip side of the loop. Use of capacitor 286 advantageously prevents any direct current (DC) current from flowing through the secondary of transformer 280. In addition, the combination of capacitor 286 and transformer 280 advantageously provides a relatively high impedance to the loop which assures that the LVM will not appreciably load the loop at the normal telephone company switching and transmission frequencies (the latter being typically 300–3000 Hz) that would appear on the loop thereby permitting the tone to remain substantially transparent to normal loop operation. As such, the sub-audible tone which appears across the secondary of the transformer is injected into loop $5_1$ and travels thereover back to an LTU situated at the telephone company central office for line verification purposes.

Power supply 290 provides DC power at a +V voltage level sufficient to power the circuitry contained within LVM 20. This supply operates off a source of 12-24 volts DC which is commonly available within a remote premise monitoring system.

Figure 14:
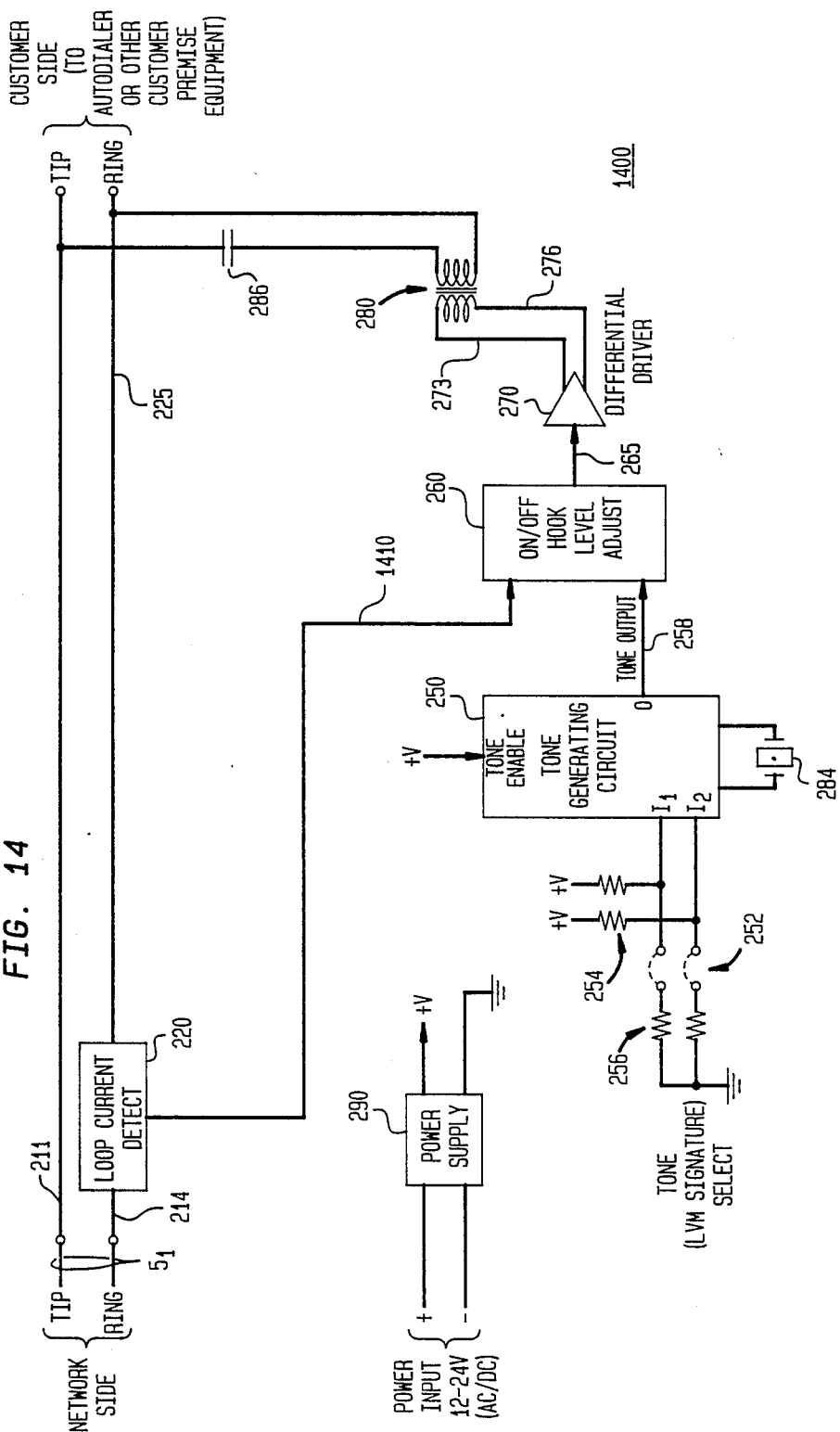
FIG. 14 is a block diagram of a second embodiment of a representative LVM, i.e. LVM 1400, which can be used for illustratively LVM 20 that forms part of the inventive system shown in FIGS. 1A and 1B.

FIG. 14 depicts a block diagram of a second embodiment of an LVM, specifically LVM 1400, that can be used for illustratively LVM 20 shown in FIGS. 1A and 1B. As discussed above, the operational difference between LVM 1400 and LVM 28, shown in FIG. 2 and discussed above, is that the former LVM continuously transmits a programmed tone over subscriber loop 5 regardless of the status of the loop; while the latter LVM, i.e. LVM 28, transmits the tone only while LVM 28 detects that the loop is operating normally in either an on- or off-hook condition. Both LVMs 28 and 1400 automatically adjust the level of the tone such that the tone remains at an approximately constant amplitude, as set forth above, regardless of whether the loop to which either LVM is connected is in an on- or off-hook condition. Inasmuch as LVM 1400 shown in FIG. 14 utilizes much, though not all, of the same constituent blocks used in LVM 28 shown in FIG. 2, then, for the sake of brevity, the following discussion will principally address the operation of LVM 1400.

In particular, tone generating circuit 250, with a high level applied to its tone enable input, continuously generates a tone at a programmed frequency over lead 258. The frequency, as described above, can be 32.8, 34.1, 36.2 or 37.5 Hz as determined by the settings of jumpers 252. This tone is applied, via lead 258, to a tone input of on/off hook level adjust circuit 260. Circuit 260, as discussed above, varies the amplitude of the tone such that the tone, as it appears on leads 211 and 225 (the customer side of subscriber loop $5_1$), will remain at approximately $-14$ dbm$\pm 5$ dbm regardless of whether that subscriber loop is, at its customer side, in an on- or off-hook condition. The other input, i.e. a control input, to circuit 260 appears over lead 1410 and is generated by loop current detect circuit 220. Detect circuit 220 produces a high level whenever the loop is in an off-hook condition (at the customer premise), during which time an appropriate amount of loop current flows through the loop, and a low level whenever the loop is in an on-hook condition during which time essentially no loop current flows. The high level appearing on lead 1410 when applied to circuit 260 causes this circuit to appropriately reduce the amplitude of the tone appearing on lead 265. Likewise, whenever subscriber loop $5_1$ is in an on-hook condition, the low level appearing on lead 1410 causes circuit 260 to appropriately increase the amplitude of the tone appearing on lead 265. In this manner, the tone, as amplified by differential driver 270 and coupled onto loop $5_1$, via transformer 280, remains at a relatively constant amplitude regardless of whether, at the customer side thereof, the loop is in an on- or off-hook condition. Inasmuch as LVM 1400 is simpler than the LVM 28, the former LVM is advantageously less expensive to manufacture than the latter LVM and hence is suited to those applications where cost is a major consideration. However, since LVM 1400 does not cease transmitting its programmed tone in response to an abnormal on-hook or off-hook condition, this embodiment of the LVM will provide a slightly decreased level of loop verification than will LVM 28— though in practice this decrease is generally insignificant for most applications.

2. Line Test Unit (LTU)

Figure 3B:
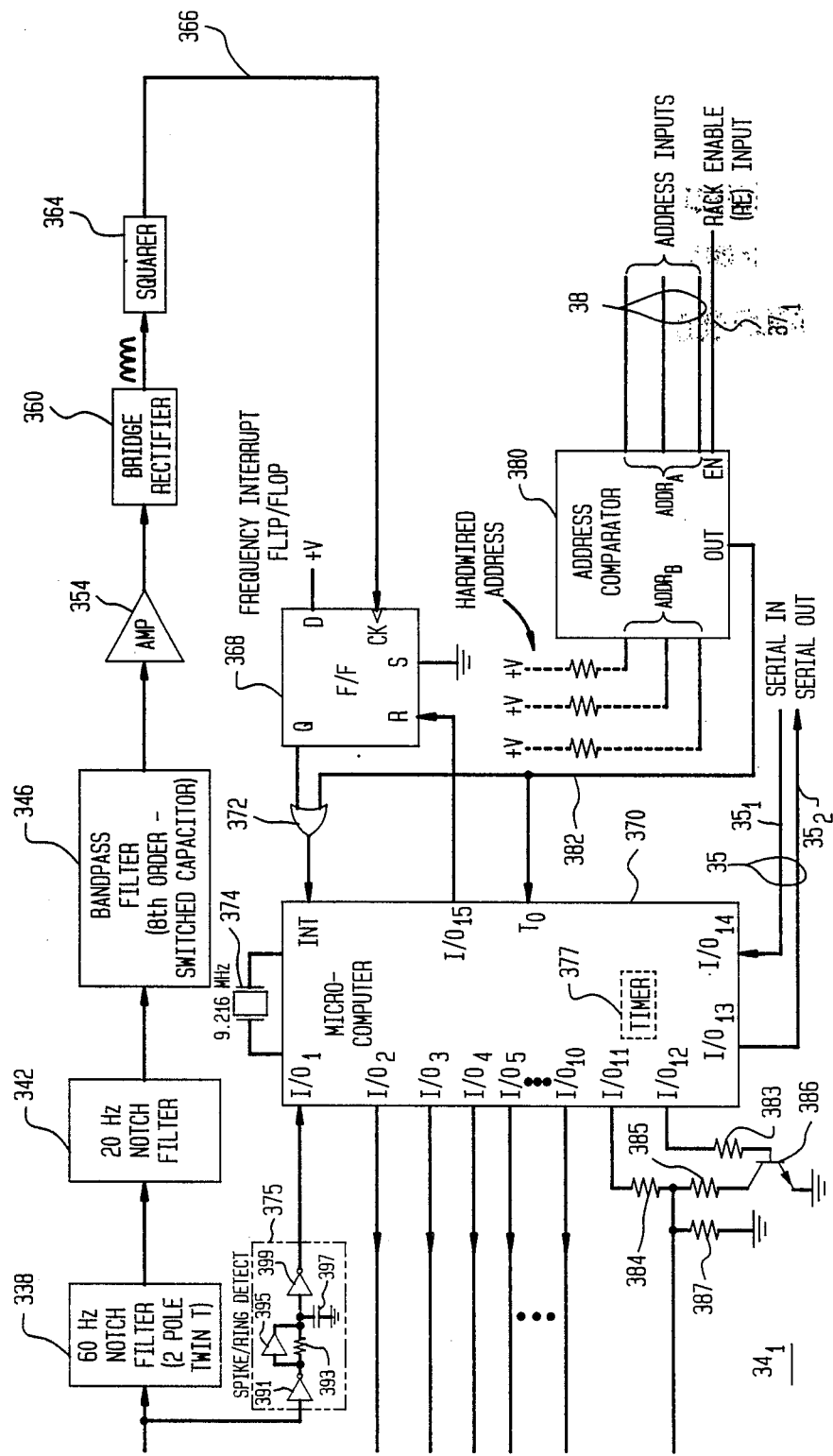

A block diagram of line test unit $34_1$ is collectively shown in FIGS. 3A-3C, for which the proper alignment of the drawing sheets for this figure is depicted in FIG. 3. As discussed above, an LVM is connected to the subscriber end of each subscriber loop and is hard-wire programmed to transmit a tone at one of four fixed sub-audible frequencies over that loop. As noted, the LVM, in one embodiment thereof, transmits that tone continuously, or, in a second embodiment thereof, only while it detects that the loop to which this LVM is connected is operating normally in both on- and off-hook conditions. In essence, the LTU is connected at the telephone company central office to a maximum of 25 separate subscriber loops. The LTU verifies the operation of these loops by sequentially scanning all of these loops to determine whether it is receiving the proper frequency sent by the corresponding LVM that is connected to the subscriber end of each of these loops. Using analog filtering and digital time measurement techniques, as discussed below, the LTU determines the presence of the programmed frequency on each loop. The LTU maintains status information, in the form of a separate Line Status Byte (LSBYTE) stored within its internal memory, for each of the 25 monitored loops. As noted above and also discussed in detail below in conjunction with FIGS. 10A, 10B and 11, upon receipt of appropriate requests from controller 32 (see FIGS. 1A and 1B), the controller can download to the LTU pre-defined information into each of these bytes or the LTU can download to the controller all the information contained in all such bytes for all active lines.

Specifically, as shown in FIGS. 3A-3C, up to twenty five separate two-wire subscriber loops $5_1, 5_2, \ldots, 5_{25}$, are connected to LTU $34_1$ via input terminals 301. Each side of the loop (tip and ring sides) is routed through a filtering and decoupling network, such as resistor 303 and capacitor 304, situated within networks 302 or 308 and terminated with an appropriate resistor, such as resistor 313, situated within terminating resistor groups 310, 312 or 314. The value of resistors 303 and 313 equals approximately 475K$\Omega$, and 200K$\Omega$, respectively. The value of capacitor 204 equals approximately 0.1 $\mu$F. These networks present a relatively high impedance to each loop thereby assuring that the presence of the LTU will have no appreciable affect on and thus remain substantially transparent to normal operation of each loop (i.e. to local telephone company signalling and transmission frequencies) to which it is connected. All of these individual networks within networks 302 and 308 are identical as are all the terminating resistors that form resistors 310, 312 and 314. The resulting differential loop signals are applied to separate though identically addressed inputs (X,Y) of analog multiplexors 316. These multiplexors are formed of individual eight input to two output multiplexor circuits $316_1, 316_2, \ldots, 316_7$.

Under control of eight bit microcomputer 370, which forms the heart of LTU $34_1$, these loops are continuously and sequentially scanned in order. This microcomputer is illustratively a model 8749H microcomputer manufactured by the Intel Corporation of Santa Clara, California. To select any one subscriber loop, such as loop $5_1$, the microcomputer applies an appropriate address to its input/output pin 2 (I/O$_2$) and I/O$_3$ pin and, via address leads 322, to address pins A and B of each analog multiplexor circuit to select the appropriate one of four inputs to each circuit, and also applies a low level, via one of its I/O$_4$ through I/O$_9$ pins and one of seven leads $325_1, 325_6, \ldots, 325_7$, to the active low chip select (CS) input of the appropriate multiplexing circuit. As a result, the signals existing on the selected loop are routed through the enabled multiplexor circuit and appear in differential form on outputs O$_1$ and O$_2$ and, in turn, via leads 318, at the inputs of differential amplifier 330. The gain of this amplifier is set at unity through appropriate selection of the values (which are not critical) of resistors 332 and 334. Resulting single ended signals produced by differential amplifier 330 are sequentially passed through 60 Hz notch filter 338 to remove substantially all power line hum from this signal and 20 Hz Notch filter 342 to substantially remove all telephone ringing frequencies from this signal. The resulting signal is then routed through bandpass filter 346, which is preferably an eight pole (48 db/octave rolloff) switched capacitor filter with a center frequency of approximately 35 Hz. This filter can illustratively be implemented using two serially connected model MF8 fourth order switched capacitor bandpass filter circuits that are currently available from National Semiconductor Corporation located in Santa Clara, California. Due to the sharpness of the response of this filter, the two extreme frequencies that can be produced by the LVM, namely 32.8 and 37.5 Hz, fall three db down on either side of the center frequency (commonly known as frequency $f_0$) in the response characteristic of filter 346. The sinusoidal output of this filter is amplified by amplifier 354 and passed through bridge rectifier 360 which full wave rectifies the filtered output signal thereby effectively doubling its frequency. The rectified output produced by rectifier 360 is routed through squarer 364 which squares the rectified voltage. By doubling the frequency, the number of edge transitions provided by squarer 364 per unit time is doubled. This, in turn, increases the number of possible measurements that can be made per unit time thereby increasing the measurement accuracy obtainable during this time.

As discussed in detail below, the period of each squared pulse is measured by the microcomputer by incrementing internal timer 377 with 52.08 μsec timing ticks produced by the microcomputer. Essentially, for any particular subscriber loop being scanned, if the measured period for each of a predetermined number of successive cycles of the tone appearing on that loop falls within a pre-determined tolerance band for the specific frequency which the LVM connected to that loop is expected to generate, then the microcomputer concludes that that subscriber loop is properly operating.

Specifically, to measure the period of each pulse on lead 366, the output produced by squarer 364 is applied to the clock input of D type flip flop 368. This flip flop is used to generate a sharp upward level change at the external interrupt (INT) input to microcomputer 370 and thereby interrupt normal program execution occurring therein. In particular, inasmuch as the D input to flip flop 368 is tied to +V, then a rising edge of the squared signal appearing on lead 366 sharply sets the Q output of this flip flop high. The signal present at the Q output is routed through one input of OR gate 372 to the external interrupt input of the microcomputer and thereby serves as the "frequency" interrupt. The occurrence of this interrupt causes the microcomputer to start a "measurement interval" by saving the current contents of the timer into variable COUNT1, as discussed in detail below in conjunction with Interrupt Service Routine 800 as shown on FIG. 8, with the overflow of this timer residing in variable COUNT2. The values in these variables are then appropriately processed, as discussed in detail below in Loop Status Verification Routine 500 and Learn Routine 600 depicted in FIGS. 5A-5C and 6A-6D, respectively, to identify, through a time period measurement of a cycle of the tone, the frequency produced by an LVM. Once this external interrupt has been processed, the microcomputer, as shown in FIGS. 3A-3C, applies a pulse to its I/O$_{15}$ pin to the reset (R) input of flip flop 368 thereby resetting the Q output to zero in preparation for the next frequency interrupt which, at its occurrence, ends the present measurement interval to provide a time period measurement of the current cycle of a tone and begins the next measurement interval to provide a successive time period measurement of the next cycle of a tone.

External interrupts are also generated whenever controller 32 (see FIGS. 1A and 1B) intends to pass an appropriate request to LTU 34$_1$. As discussed above, the controller establishes communication with a particular LTU, e.g. LTU 34$_1$, on an interrupt basis. In particular, controller 32 places an appropriate address on address leads 38 and an appropriate high level on a corresponding rack enable lead, e.g. lead 37$_1$. Once this occurs, as shown in FIGS. 3A-3C, address comparator 380 compares the levels appearing on address leads 38 and routed to its Address A inputs to a hardwired three bit address appearing at its Address B inputs. Each LTU within a particular rack has a different three bit hardwired address. The high level appearing on rack enable lead 37$_1$ is routed to the enable (EN) input of the address comparator to suitably enable the comparator. If the addresses match, then address comparator 380 produces a high level at its output (OUT) pin. This high level is applied, via lead 382, through a second input of OR gate 372 to the external interrupt of microcomputer 370. To allow the microcomputer to differentiate between the source of the external interrupts, i.e. either a "frequency" or a "controller" interrupt, the level appearing on lead 382 is also connected to input pin T$_0$, the level at which can be tested by executing appropriate conditional transfer instructions within the microcomputer.

Two I/O pins, specifically pins I/O$_{13}$ and I/O$_{14}$, are used to implement a serial communication path, using a protocol very similar to RS-232, over leads 35 from microcomputer 370 to controller 32 (see FIGS. 1A-1C). As shown in FIGS. 3A-3C, lead 35$_1$ carries incoming serial communication from controller 32 to microcomputer 370; while, lead 35$_2$ carries outgoing serial communication from microcomputer 370 to controller 32.

Spike/ring detect circuit 375 provides a high level while a spike or ring occurs. Inasmuch as telephone ringing energy is quite high, i.e. ring voltages can reach 150 volts, ringing corrupts any tone placed onto the loop. As a result, frequency measurements are not made during any ring. Generally, individual rings occur for two seconds on and four seconds off. Frequency measurements can be made whenever a loop is not ringing and during the off times between adjacent rings. Specifically, whenever a spike or ring occurs, circuit 375 provides a high level to pin I/O$_1$ on microcomputer 370. In response to this level, the microcomputer merely waits for the ringing or spike to terminate on a loop before proceeding any further with any measurements on that loop. Circuit 375 contains inverter 391 which provides a low level whenever the output of differential amplifier 330 saturates, which occurs during a spike or ring condition. The output of this inverter is applied to an R-C circuit, containing resistor 393 (typically 750KΩ in value, though not critical) and capacitor 397 (typically 2.2 μF in value, also not critical), which through integrating the output signal produced by inverter 391, provides low pass filtering and stabilizes the output of this circuit. Diode 395 which is connected across resistor 393 provides a low impedance discharge path for capacitor 397. The voltage appearing across the capacitor is applied to inverter 399; the output of which is, in turn, applied to pin I/O$_1$ of microcomputer 370.

LTU 34$_1$ also contains a self test capability. Specifically, under appropriate software control, as discussed below in conjunction with Line Check Routine 700 shown in FIGS. 7A and 7B, microcomputer 370 produces a square wave output on test signal lead 389. The square wave test signal can have a frequency of 20 Hz, 60 Hz or 35.2 Hz and be set to either a high or low level. Test signals at 20 Hz and 60 Hz are applied to lead 389 at a relatively high level; while test signals at 35.2 Hz are applied to this same lead at a relatively low level. If the analog filtering circuitry in the LTU is operating properly, then substantially none of either of the high level 20 Hz or 60 Hz signals should be detected by microcomputer 370, i.e. no frequency interrupts should occur during application of either of these test signals, while interrupts and appropriate period measurements should occur during application of the low level 35.2 Hz signal. By virtue of the sharp response of the analog filters, only the fundamental sinusoidal frequency component of the square wave test signal will possess sufficient energy, if at all, to pass through the filters. Operationally speaking, after every scan of 25 loops $5_1, 5_2, \ldots, 5_{25}$, has been completed, microcomputer 370, as shown in FIGS. 3A-3C, instructs multiplexor circuit $316_7$ to route the signal appearing on test lead 389 into differential amplifier 330. Inasmuch as the test signal is single ended and hence comes in on only one of the inputs associated with, what is in effect, a $26^{th}$ subscriber loop position on multiplexor circuit $316_7$, resistor 278, typically 10K$\Omega$ in value, is used to appropriately terminate the unused differential input to the multiplexor circuit. Transistor 386 and resistors 383, 384, 385 and 387 are used to provide bi-level control over the test signal. Specifically, the microcomputer generates a square wave test signal at the appropriate frequency on pin I/O$_{11}$. This signal is applied through a voltage divider formed of resistors 384 and 387. For a high level test signal, the microcomputer generates a low level signal on microcomputer pin I/O$_{12}$ which, in turn, provides insufficient base voltage to turn transistor 386 on. As such, transistor 386 remains off. Consequently, this transistor and resistor 385 have essentially no affect on the level of the test signal. Alternatively, to produce a low level test signal, microcomputer 370 applies a high level to pin I/O$_{12}$. This high level on this I/O pin, when applied through resistor 383, provides sufficient base current to turn transistor 386 on. Resistor 383 limits this base current to an appropriate value. With this transistor on, resistor 385 is effectively placed in parallel to ground with resistor 387. As a result, this lowered resistance to ground attenuates the voltage appearing on test signal lead 387.

Now, in addition to the bi-directional I/O ports discussed above, eight bit microcomputer 370 also provides internal electrically programmable read only memory (EPROM—not shown) for program and constant storage, and random access memory (RAM—also not shown) for data storage. The microcomputer runs at a clock frequency of 9.216 Mhz which is established by crystal 374.

C. DETAILED SOFTWARE DESCRIPTION

1. Overview

The software executed within the LTU by microcomputer 370 shown in FIGS. 3A-3C is formed of two basic components: a main loop and interrupt service routines. The main loop performs initialization and then reads the line status byte (LSBYTE) for each successive loop to determine whether that loop is active and, for an active loop, then determines, if necessary, the frequency being transmitted by the LVM connected to that loop and, using this frequency information, subsequently verifies the integrity of that loop. The interrupt service routines service the external interrupt and the internal timer overflow interrupt. The external interrupt routine, and the routines it calls, handle communication between the LTU and controller 32 (see FIGS. 1A and 1B) as well as begin a period measurement of each cycle of a received tone produced by an LVM.

2. Main Loop 400

Figure 4:
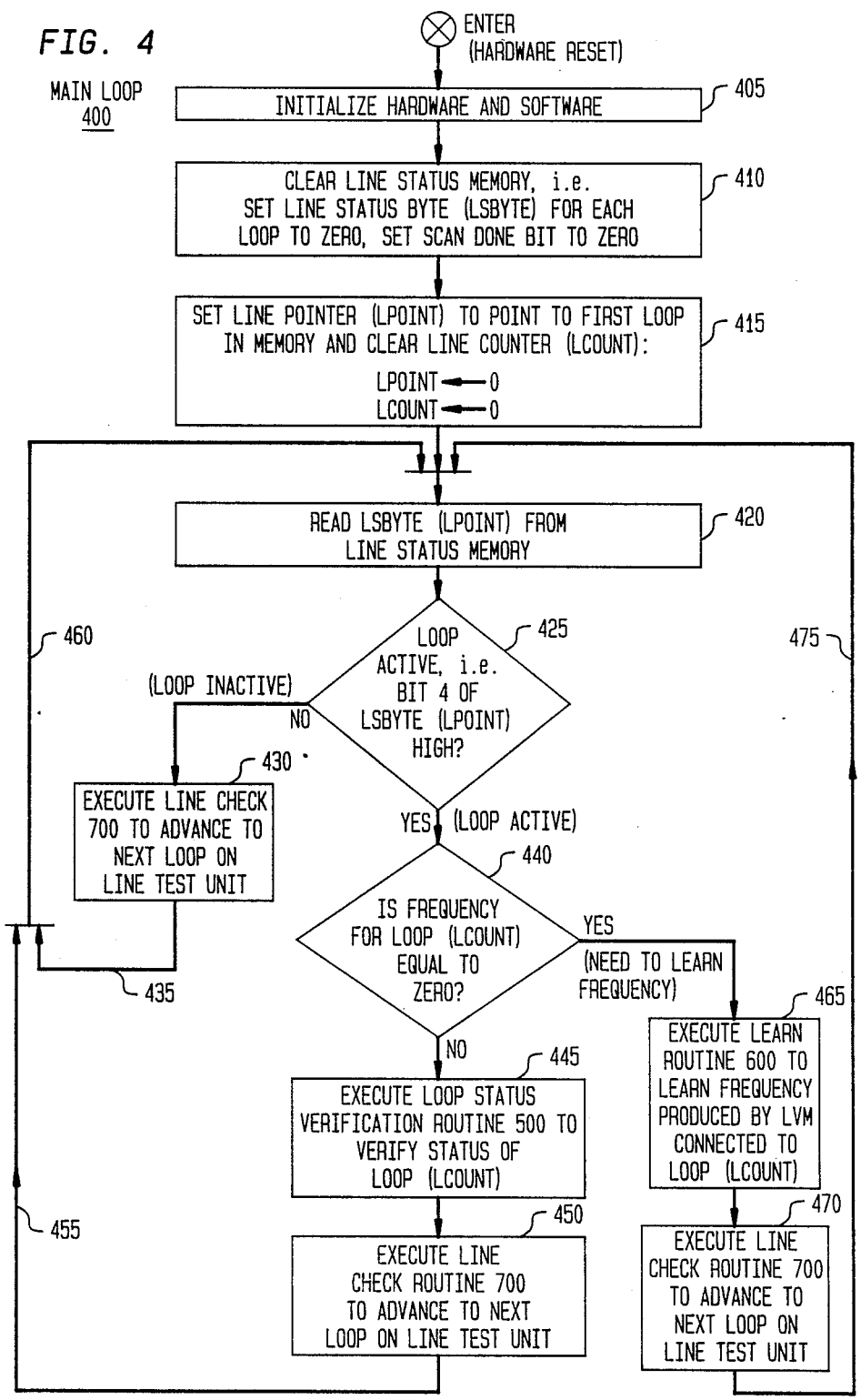
FIG. 4 depicts a flowchart of Main Loop 400 executed by microcomputer 370 situated within line test unit $34_1$ shown in FIGS. 3A-3C.

FIG. 4 depicts a flowchart of Main Loop 400.

Upon entry into this routine, which occurs as a result of a hardware reset (such as during a power on condition), execution proceeds to block 405. This block, when executed, initializes the LTU hardware and the microcomputer software. Thereafter, block 410 is executed to clear the line status memory. This memory is a table stored in internal RAM in the microcomputer and contains a separate byte, i.e. the line status byte (LSBYTE), for each of twenty fives loops that the LTU can verify. This byte has the organization shown in Table 1 below. The use of this byte and its constituent fields will become quite evident from the following discussion of the system software.

TABLE 1

| Line Status Byte | | | |
|---|---|---|---|
| bits: 7 \| 6 \| 5 | 4 | 3 | 2 \| 1 \| 0 |
| Signature | Loop Active/ Inactive | Range Failure | ERRORS | where:
the Signature bits (bits $<7:5>$) is a three bit number that identifies the specific frequency that the LTU connected to this loop is expected to transmit;
the Loop Active/Inactive bit (bit $<4>$) is a single bit that is set by microcomputer 370 under instruction of the controller to signify that the associated loop is active, i.e. to be verified, or inactive;
the Range Failure bit ($<$bit 3$>$) is set by microcomputer 370 to signify that it is detecting that the loop is transmitting a different one of the four permissible frequencies than that specified by the signature bits; and
the ERRORS bits (bits $<2:0>$) store a current count of the verification (loop) failures associated with this loop.

Now, once all the line status bytes have been set to zero, block 410 also resets the SCAN DONE flag (bit) to zero. This flag is set subsequently in the system software once the LTU has completed a full scan of all active loops. Next, execution proceeds to block 415 which, when executed, sets a line pointer (LPOINT) to point to a location (illustratively location zero) in RAM memory, of the LSBYTE for the first loop and then clears the contents of a line counter (LCOUNT) to zero. The line pointer points to the LSBYTE for the current loop being scanned. The line counter maintains a count of the total number of the twenty five lines that could be connected to the LTU that are actually active at any one time.

Once these operations have concluded, execution proceeds to block 420 which reads the LSBYTE from memory for the current loop, i.e. loop (LPOINT). Thereafter, decision block 425 is executed to test the status of bit four of this LSBYTE to determine whether this loop is active or not. In the event this loop is not active, then decision block 425 routes execution, via its NO path, to block 430. This block executes Line Check Routine 700, which will be discussed below in conjunction with FIGS. 7A and 7B, to advance the scan to the next loop. Once this routine has executed, execution loops back, via paths 435 and 460, to block 420 to read the LSBYTE for the next successive loop and so on. Alternatively, if the loop is active, then decision block 425 routes execution, via its YES path, to decision block 440.

Decision block 440 reads the signature bits, bits <7:5>, from the LSBYTE for the current loop, i.e. LSBYTE (LPOINT), and tests whether these bits are equal to zero. If these bits are zero, then the LTU has not been informed by the controller of the specific one of the four permissible frequencies which the LVM attached to this loop is expected to transmit. In this case, decision block 440 routes execution, via its YES path, to block 465. This latter block executes Learn Routine 600, which will be discussed in detail below in conjunction with FIGS. 6A-6D, that determines, through digital period measurements, the specific frequency being transmitted by the LVM onto this loop and then appropriately sets the signature bits in LSBYTE (LPOINT) accordingly. Thereafter, execution proceeds to block 470 to execute Line Check Routine 700 to advance the scan to the next loop. Execution then loops back, via path 475, to block 420 to read the LSBYTE for the next successive loop and so on. Alternatively, if the signature bits tested by decision block 440 are non-zero, i.e. signifying that the specific frequency which the LVM is expected to transmit onto to this loop is known by the LTU, then decision block 440 routes execution, via its NO path, to block 445. This latter block executes Loop Status Verification Routine 500, which will be discussed in detail below in conjunction with FIGS. 5A-5C, to verify the integrity of that loop by determining whether that specific frequency is actually appearing on that loop and if not to set the ERRORS bits to indicate a loop failure. Once routine 500 completely executes, execution proceeds to block 450 to execute Line Check Routine 700 to advance the scan to the next loop. Execution then loops back, via path 455, to block 420 to read the LSBYTE for the next successive loop and so on.

3. Loop Status Verification Routine 500

As discussed above, Loop Status Verification Routine 500, which executes as part of Main Loop 400, verifies the integrity of a loop currently being scanned by the LTU by determining whether a specific expected one of the four test frequencies actually appears on that loop and, if it does not appear, then appropriately incrementing the value of the ERRORS field (bits <2:0>) in the LSBYTE for that loop to indicate a loop failure.

Figure 5B:
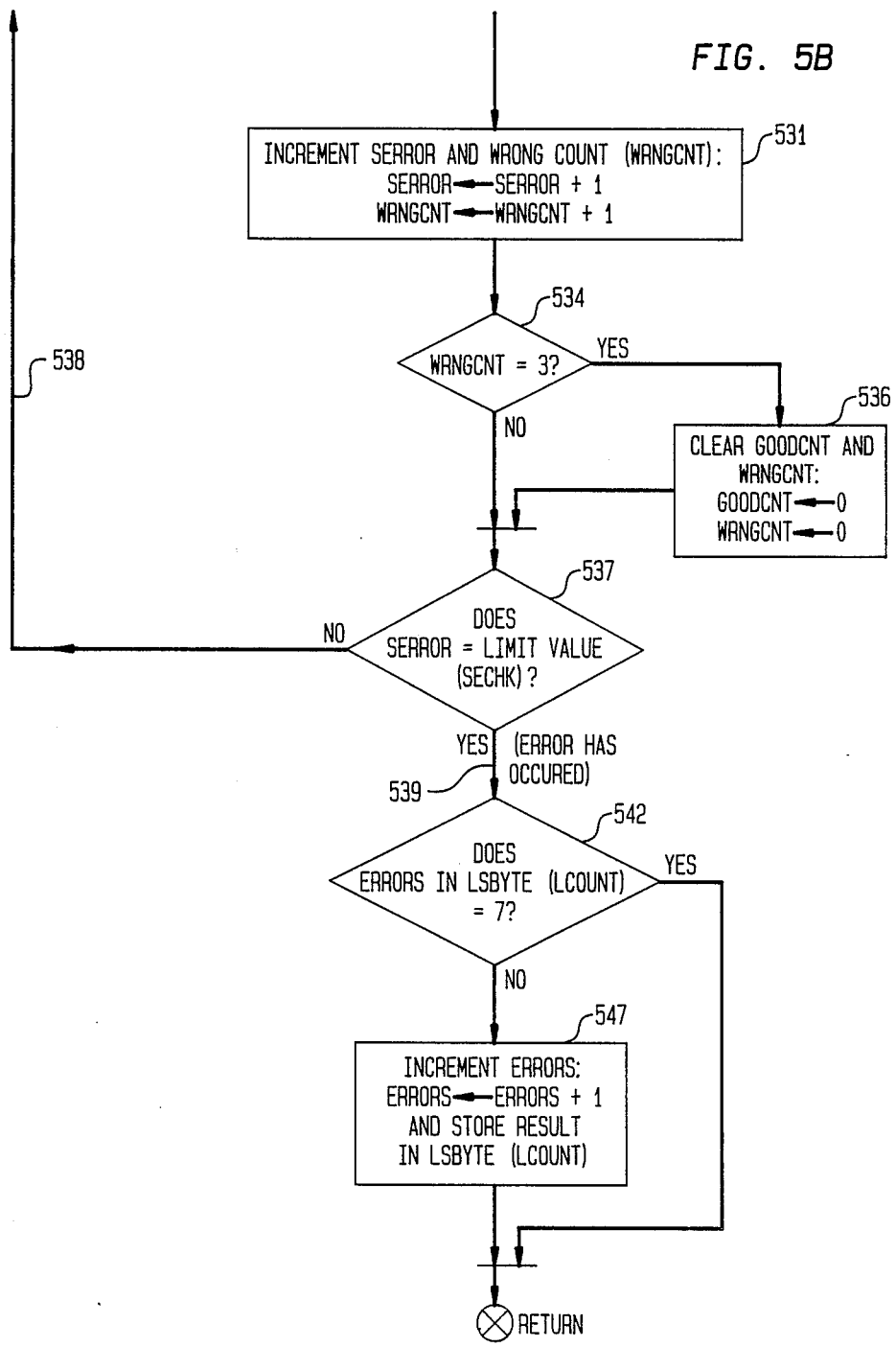
Figure 5C:
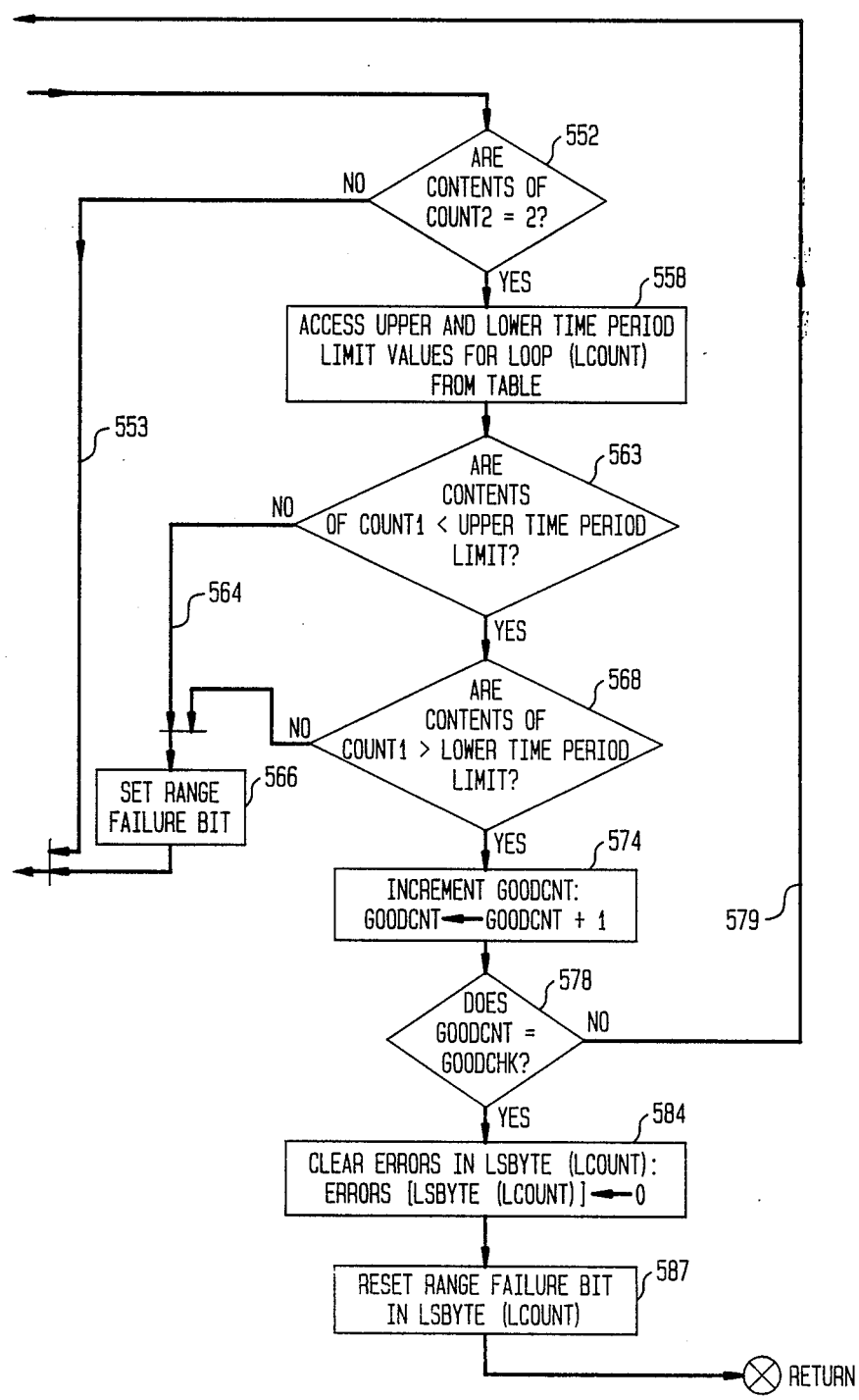

A flowchart of Loop Status Verification Routine 500 is collectively depicted in FIGS. 5A-5C, for which the correct alignment of the drawing sheets for these figures is shown in FIG. 5.

Upon entry into this routine, execution proceeds to block 503 to increment the contents of the line counter (LCOUNT) by one to account for this active loop in the current scanning cycle. Thereafter, block 506 is executed to apply proper address and chip select signals to analog multiplexor circuits 316 (see FIGS. 3A-3C) to select the current loop and apply the analog signals appearing thereon to differential amplifier 330 and the analog filtering circuits situated within the LTU. Once this occurs, as shown in FIGS. 5A-5C, execution proceeds to block 510 to clear the contents of two variables, COUNT1 and COUNT2, that are used in making a digital period measurement of each cycle of the filtered analog signal received from the LVM and to clear the variable "Short Errors" (SERROR), which is discussed in detail below.

A period measurement of an incoming tone produced by an LVM and appearing on a loop currently being scanned is made using internal timer 377 situated within microcomputer 370 (see FIGS. 3A-3C). This timer is programmed during initialization to increment every 52.08 $\mu$sec. At the beginning of any period measurement for a cycle of the incoming tone, the timer is loaded with an offset value, specifically "$46_{10}$", and then allowed to overflow twice. At the occurrence of the next frequency interrupt, which indicates that the prior cycle has just terminated, the count in the timer is read and compared against a window of upper and lower limit values for the frequency that is expected to appear on that loop. A non-overlapping window having separate upper and lower limit values is defined for each of the four specific test frequencies. If the count falls within the window for the appropriate frequency for that loop and for a pre-defined number of adjacent cycles thereof, as defined in variable "GOOD CHECK" (GOODCHK), then that loop is deemed to be operational and the ERRORS bits are set to zero within the LSBYTE for this loop. The value of the offset, here "$46_{10}$", is not critical but is chosen to permit the count at the end of each cycle of the tone to fall within the middle of the eight bit range of the timer.

Now, with this in mind, after block 510 executes, execution passes to decision block 513. This latter block determines whether the contents of COUNT1 are greater than zero. In the event these contents are not greater than zero, thereby indicative of an incomplete period measurement, execution proceeds from decision block 513, via NO path 515, to decision block 518. This latter decision block tests the status of pin I/O$_1$ (see FIGS. 3A-3C) on the microcomputer to determine whether a spike or ring is occurring. If a spike or ring is not occurring, i.e. the level of this I/O pin is low, then, as shown in FIGS. 5A-5C, decision block 518 routes execution, via its NO path, to decision block 523. This latter decision block tests the value of COUNT2, which holds the overflow value from the internal timer and is appropriately set during execution of Timer Interrupt Service Routine 1300, as discussed below in conjunction with FIG. 13. If this value is not excessive, i.e. equal to or less than two, which indicates that a normal measurement is occurring thusfar, then, as shown in FIGS. 5A-5C, execution loops back from decision block 523, via NO path 524, to decision block 513 to await completion of the measurement, i.e. an occurrence of a "frequency" interrupt resulting in the value of variable COUNT1 being set to a value greater than zero. Now, in the event that either a spike or ring occurs or the contents of COUNT2 are excessive, i.e. greater than two, an error condition has occurred. Specifically, if a spike or ring occurs (the level on microcomputer pin I/O$_1$ is high), then decision block 518 routes execution to block 528. This latter block, when executed, merely causes microcomputer 370 to delay any further measurements for two seconds in order to wait for a detected ringing condition to terminate. Any spike will terminate well within this two second period. Once block 528 executes, execution proceeds to block 531. In the event the contents of COUNT2 are excessive, then decision block 523 routes execution, via YES path 525, to block 531.

Block 531, when executed, increments the current value of both SERROR and wrong count (WRNGCNT) by one. The variable SERROR is used, as discussed below, to count the number of individual adjacent cycles of a filtered analog tone for a currently scanned loop that occur during any one scanning cycle for which an error, such as a ring, spike or excessive count, occurred or for which an incorrect frequency value was measured. As noted, to be acceptable, an incoming tone must produce correct period measurements for a specified number (GOODCHK) of incoming cycles of this tone. An erroneous condition occurs if three successive cycles of the incoming tone produce incorrect results. This loop is deemed to have failed if these errors persist for a sufficient number of sets of time period measurements, as specified by the value of variable SECHK which is discussed below. Time period measurements continue to be made for a loop until those measurements either result in an error condition or a correct frequency measurement. Additional sets of time period measurements are made by the LTU for that loop without advancing to the next loop until the loop being measured either passes, i.e. is deemed to be operational, or fails. With this in mind, once block 531 is executed, execution proceeds to decision block 534. This latter block determines whether three successive cycles have all resulted in erroneous conditions, i.e. WRNGCNT equals three. If WRNGCNT is less than three, then these cycles are effectively ignored inasmuch as execution proceeds, via the NO path emanating from this decision block, to decision block 537. Alternatively, if WRNGCNT equals three, then decision block 534 routes execution, via its YES path, to block 536 to clear the contents of WRNGCNT and GOODCNT in preparation for the next set of time period measurements (occurring during successive measuring intervals) to be taken for this loop. Execution then proceeds to decision block 537. This decision block, when executed, tests the value of SERROR to determine whether it has reached a limit value defined by the value of variable "Short Errors Check" (SECHK), which may typically be ten. If, in the event the value of SERROR is less than SECHK, then execution loops back from decision block 537, via NO path 538, to block 510 to begin a new set of period measurements on the same loop. However, if the value of variable SERROR equals that of variable SECHK, thereby signifying that a pre-determined number of sets of period measurements (occurring over successive measuring intervals) have failed to yield a sufficient number of adjacent cycles each having a correct time period measurement, then decision block 537 routes execution, via YES path 539, to decision block 542. This latter decision block tests whether the value of the ERRORS field, i.e. loop failure errors, that forms part of the LSBYTE for the current loop equals a limit value, e.g. seven. This value is periodically supplied to controller 32 (see FIGS. 3A–3C), upon receipt of a suitable request therefrom by microcomputer 370. In the event that this value reaches seven, then the controller appropriately declares a loop failure and so notifies both a corresponding alarm company and the local telephone company. Now, if the current value of the ERRORS field situated in the LSBYTE for the current loop is less than seven, then, as shown in FIGS. 5A–5C, decision block 542 routes execution, via its NO path, to block 547 which, when executed, increments the value of this field by one and stores the resulting value back into the ERRORS field. Once this occurs or in the event the current value of the ERRORS field for this loop already equals seven and execution has been directed to the YES path emanating from decision block 542, then execution returns from routine 500 back to Main Loop 400.

Now, alternatively, if the contents of variable COUNT1 at the end of any time period measurement (i.e. at the occurrence of a "frequency" interrupt) are greater than zero, then decision block 513 routes execution, via YES path 514, to decision block 552 to begin checking the value of the measured period. Decision block 552, when executed, tests whether the value of variable COUNT2 equals two, i.e. the internal timer has overflowed twice. In the event the value of COUNT2 is less than two, an erroneous period measurement has occurred. In this case, decision block 552 routes execution, via NO path 553 and path 556, to block 531 to increment SERROR and WRNGCNT and appropriately process the error condition. Alternatively, if the contents of COUNT2 equal two, then decision block 552 routes execution, via its YES path, to block 558. This block, when executed, accesses, from the internal EPROM memory in the microcomputer, the upper and lower time period limit values, i.e. expected values for COUNT1, that correspond to the specific expected frequency for the loop presently being scanned. These limit values are used to form a window against which the current period measurement, i.e. the contents of COUNT1, are to be compared. If the contents of COUNT1 fall within this window, then the current period measurement is acceptable; otherwise, an erroneous condition has occurred. Specifically, once these limit values have been accessed, execution proceeds from block 558 to decision block 563. This decision block determines whether the contents of COUNT1 are less than the upper time period limit. If the contents of COUNT1 are less than the upper time period limit value, then decision block 563 routes execution, via its YES path, to decision block 568. This latter decision block, when executed, determines whether the contents of COUNT1 are greater than the lower time period limit value. In the event the current contents of COUNT1, i.e. the time period measurement, are either greater than or equal to the upper time period limit value or less than or equal to the lower time period limit value, then an error condition has occurred. In this instance, execution proceeds to block 566 either via NO path 564 emanating from decision block 563 or the NO path emanating from decision block 568, respectively. Block 566 sets the Range Failure bit high. When set, this bit indicates that although a tone was measured on the current loop, its value is not within a window of permissible values, i.e. the value is out of range, for the tone that is expected to appear on this loop. Once block 566 executes, execution proceeds, via path 556, to block 531 to increment SERROR and WRNGCNT and thereafter appropriately process this error condition. If, however, the contents of COUNT1 fall within the window, then decision block 568 routes execution, via its YES path, to block 574 which, when executed, increments the value of GOODCNT by one to signify that a cycle on the loop occurred that has a correct time period. After block 574 has executed, execution proceeds to decision block 578. This decision block, determines whether a sufficient number of adjacent cycles having correct time measurements has occurred. Specifically, decision block 578 compares the current value of variable GOODCNT against the value of variable GOODCHK. In the event that an insufficient number of such cycles has occurred, then decision block 578 routes execution, via path 579, back to block 510 to begin a new set of period measurements on the same loop. Alternatively, if a sufficient number of acceptable cycles has occurred, i.e. the value of variable GOODCNT equals the value stored in GOODCHK, then decision block 578 routes execution, via its YES path, to blocks 584 and 587. These latter blocks, when executed, successively clear the value of the ERRORS field (bits <2:0>) and the Range Failure bit (bit 3) in the LSBYTE for the current loop. After these blocks have executed, execution returns to Main Loop 400 from routine 500.

4. Learn Routine 600

As discussed above, Learn Routine 600, which executes as part of Main Loop 400, determines, through digital period measurements, the specific frequency being transmitted by an LVM onto a loop currently being scanned by the LTU and then sets the signature bits in the corresponding LSBYTE accordingly.

Figure 6B:
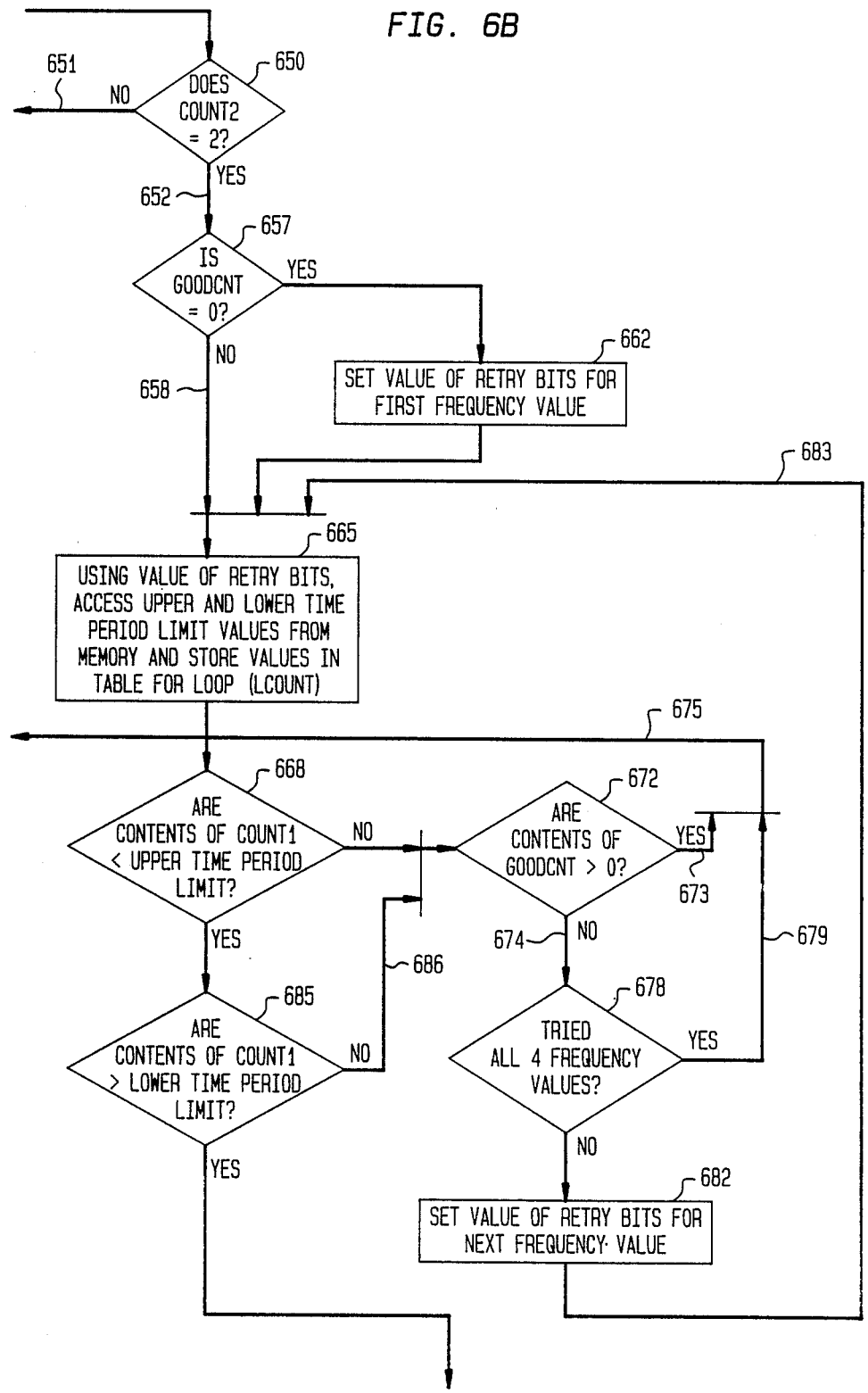
Figure 6C:
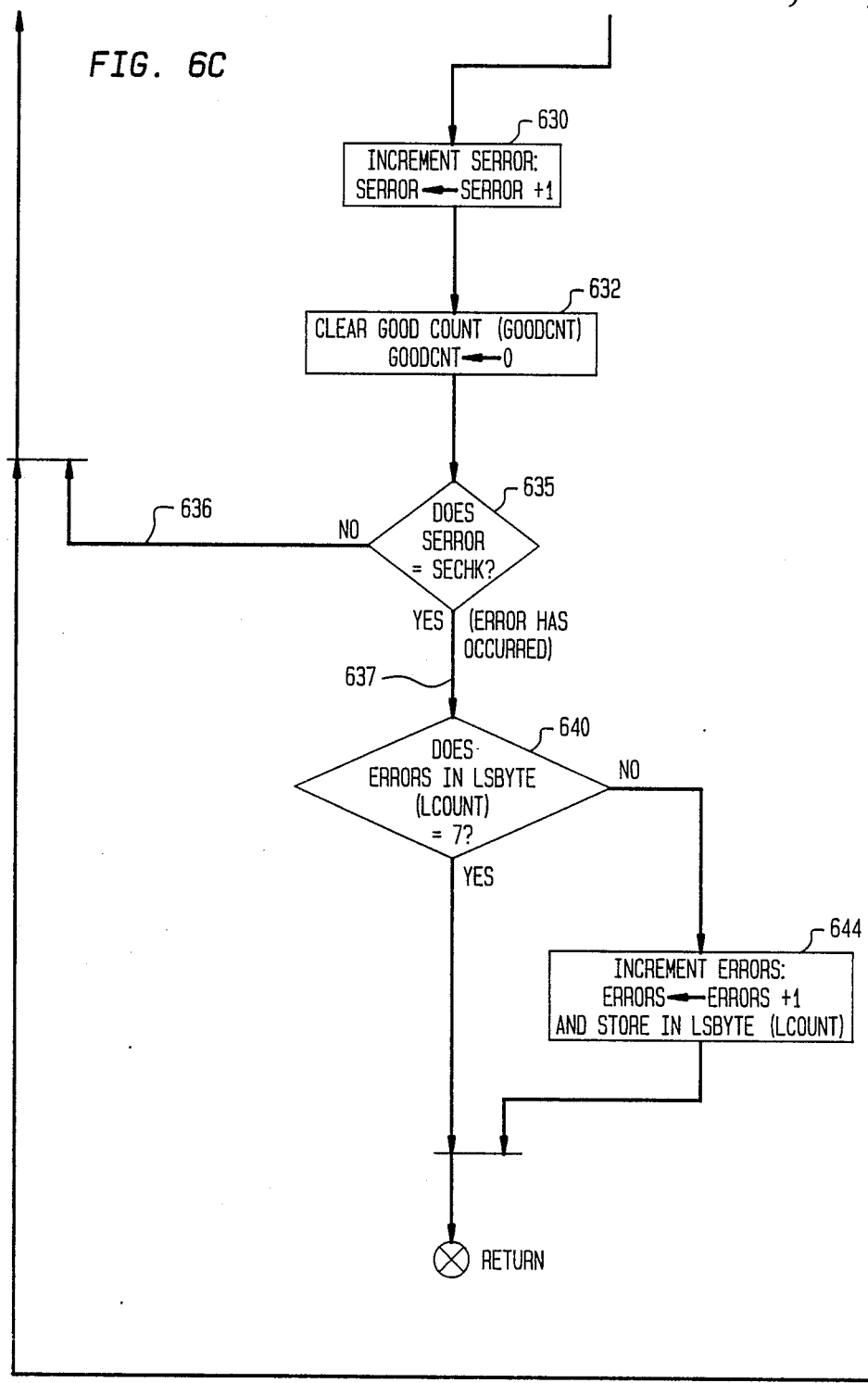
Figure 6D:
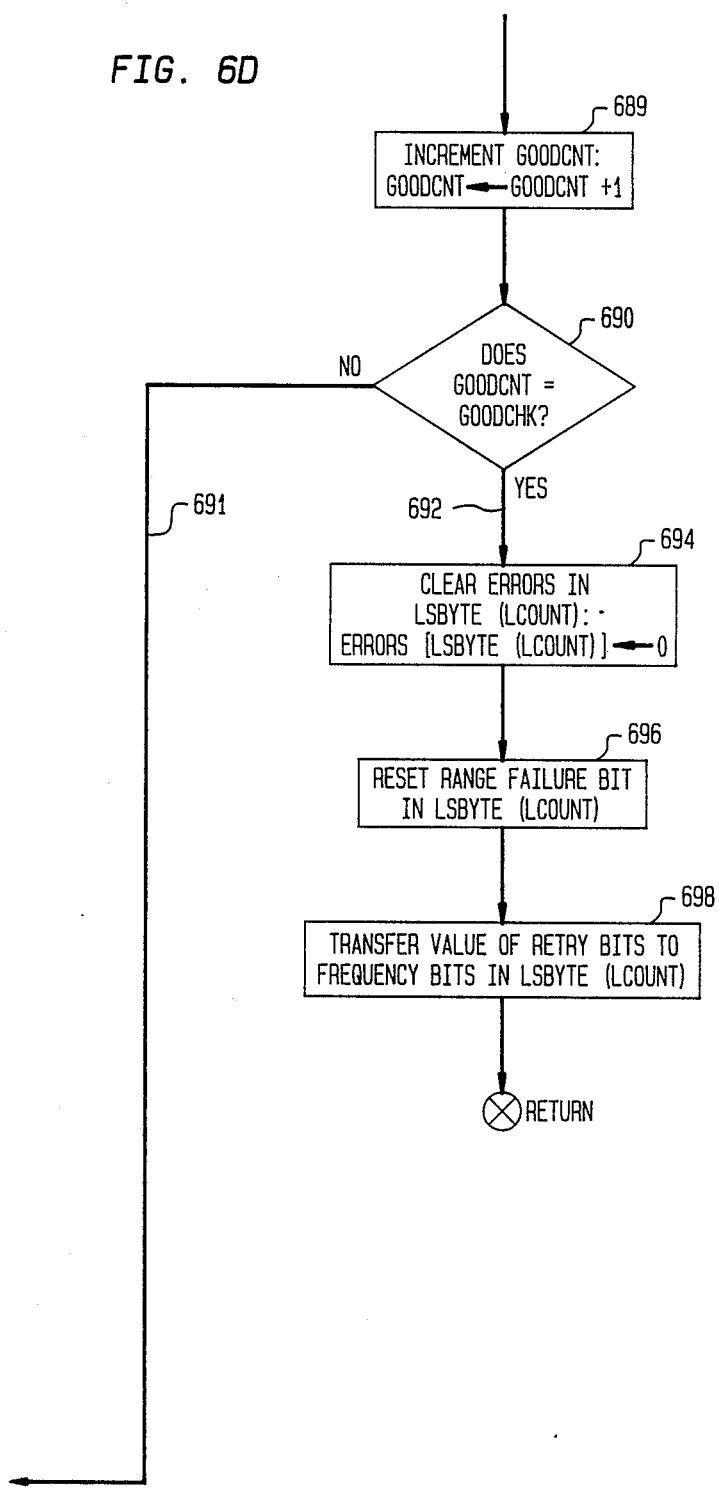

A flowchart of Learn Routine 600 is collectively depicted in FIGS. 6A–6D, for which the correct alignment of the drawing sheets for these figures is shown in FIG. 6.

Upon entry into this routine, execution proceeds to block 602 to increment the contents of the line counter (LCOUNT) by one to account for this active loop in the current scanning cycle. Thereafter, block 605 is executed to apply proper address and chip select signals to analog multiplexor circuits 316 (see FIGS. 3A–3C) to select the current loop and apply the analog signals appearing thereon to differential amplifier 330 and the analog filtering circuits situated within the LTU. Once this occurs, as shown in FIGS. 6A–6D, execution proceeds to block 608 to clear the contents of two variables, COUNT1 and COUNT2, that are used in making a digital period measurement of each cycle of the filtered analog signal received from the LVM and to clear the variable SERROR. After block 608 executes, execution passes to decision block 612. This latter block determines whether the contents of variable COUNT1 are equal to zero. In the event the contents equal zero, thereby indicative of an incomplete period measurement, execution proceeds from decision block 612, via YES path 614, to decision block 618. This latter decision block tests the status of pin I/O$_1$ (see FIGS. 3A–3C) on the microcomputer to determine whether a spike or ring is occurring. If a spike or ring is not occurring, i.e. the level of this I/O pin is low, then, as shown in FIGS. 6A–6D, decision block 618 routes execution, via its NO path, to decision block 622. This latter decision block tests the value of variable COUNT2, which holds the overflow value from the internal timer and is appropriately set during execution of Timer Interrupt Service Routine 1300, as discussed below in conjunction with FIG. 13. If this value is not excessive, i.e. equal to or less than two, which indicates that a normal measurement is thusfar occurring, then, as shown in FIGS. 6A–6D, execution loops back from decision block 622, via NO path 624, to decision block 612 to await completion of the measurement, i.e. when the contents of COUNT1 are set at the occurrence of a "frequency" interrupt to a value greater than zero. Now, in the event that either a spike or ring occurs or the contents of variable COUNT2 are excessive, i.e. greater than two, an error condition has occurred. Specifically, if a spike or ring occurs (the level on microcomputer pin I/O$_1$ is high), then decision block 618 routes execution to block 627. This latter block, when executed, merely causes microcomputer 370 to delay any further measurements for two seconds in order to wait for a detected ringing condition to terminate. Any spike will terminate well within this two second period. Once block 627 executes, execution proceeds to block 630. In the event the contents of variable COUNT2 are excessive, then decision block 622 routes execution, via YES path 623, to block 630.

To begin processing this error condition, block 630, when executed, increments the value of variable SERROR by one. Thereafter, execution proceeds to block 632 which clears the contents of variable GOODCNT. Next, decision block 635 is executed to test the value of SERROR to determine whether it has reached a limit value defined by the value of variable SECHK, which as noted may typically be ten. If in the event the value of SERROR is less than SECHK, then execution loops back from decision block 635, via paths 636 and 638, to block 608 to begin a new set of period measurements on the same loop. However, if the value of variable SERROR equals that of variable SECHK, thereby signifying that a pre-determined number of sets of period measurements has failed to yield a sufficient number of adjacent cycles each having an acceptable time period measurement, then decision block 635 routes execution, via YES path 637, to decision block 640. This latter decision block tests whether the value of the ERRORS field, i.e. loop failure errors, that forms part of the LSBYTE for the current loop equals a pre-defined limit value, e.g. seven. In the event that the value of the ERRORS field reaches seven, then the controller appropriately declares a loop failure and so notifies both a corresponding alarm company and the local telephone company. Now, if the current value of the ERRORS field for the current loop is less than seven, then decision block 640 routes execution, via its NO path, to block 644 which, when executed, increments the value of this field by one and stores the resulting value back into the ERRORS field. Once this occurs or in the event the current value of the ERRORS field for this loop already equals seven and execution has been directed to the YES path emanating from decision block 640, then execution returns from routine 600 back to Main Loop 400.

Now, alternatively, if the contents of variable COUNT1 occurring at the end of any time period measurement (i.e. the occurrence of a "frequency" interrupt) are not equal to (i.e. here greater than) zero thereby indicative of a potentially valid value for variable COUNT1, then decision block 612 routes execution, via NO path 613, to decision block 650 to begin determining whether the value of the measured period corresponds to that of any of the four permissible frequencies. Specifically, decision block 650, when executed, tests whether the value of variable COUNT2 equals two, i.e. if the internal timer has overflowed twice. In the event the value of variable COUNT2 is less than two, an erroneous period measurement has occurred. In this case, decision block 650 routes execution, via NO path 651, to block 630 to increment the contents of variable SERROR and thereafter appropriately process this error condition. Alternatively, if the contents of variable COUNT2 equal two, then decision block 650 routes execution, via YES path 652, to block 657. This block, when executed, tests whether the value of variable GOODCNT equals zero. In the event this value equals zero, then the present cycle being measured represents the first cycle, of the tone being measured, that has a potentially valid time period. As such, the measured time period value (value of variable COUNT1) will be successively compared against the windows for up to all four permissible frequencies to determine which specific window, if any, will contain measured period value. Consequently, decision block 657 routes execution, via its YES path, to block 662 which, when executed, sets the value of RETRY bits to a number that corresponds to the first of the four permissible frequency values. Once this occurs or in the event the contents of variable GOODCNT are greater than zero and decision block 657 has routed execution to path 658, execution will proceed to block 665.

In order for a time period measurement and frequency determination to be deemed sufficiently valid such that its corresponding signature value can be stored within the LSBYTE for the current loop, that same frequency determination must occur over a pre-defined number, i.e. as specified by the value of variable GOODCHK, of successively measured cycles of the tone transmitted by the LVM on the current loop. If this determination does not occur over the pre-defined number of successively measured cycles, then an error condition exists. Time period measurements on any one loop continue, before advancing to the next loop, until either a valid frequency is determined and its corresponding signature value (specifically the value of the RETRY bits) is stored in the signature field of the LSBYTE for the current loop or a loop failure occurs.

Specifically, block 665, when executed, retrieves, from the internal EPROM memory in the microcomputer, the upper and lower time limit values for the frequency value defined by the contents of the RETRY bits and stores these limit values in a location in a table associated with the current loop. Thereafter, execution proceeds to decision block 668 to test whether the current contents of variable COUNT1 are less than the upper time period limit value. In the event the contents are less than this limit value, then decision block 668 routes execution, via its YES path, to decision block 685. This latter decision block determines whether the current contents of variable COUNT1 are greater than the lower limit value. Now, in the event the contents are variable COUNT1 are either greater than or equal to the upper limit value or less than or equal to the lower limit value, execution will proceed to decision block 672 either via the NO path emanating from decision block 668 or via NO path 686 emanating from decision block 685. Either of these results indicates that the value of variable COUNT1 did not fall within the window for the first frequency value as defined by the value of the RETRY bits. Now, if a valid frequency determination has not yet been obtained and the value of variable COUNT1 has not yet been matched against the windows for all four permissible frequency values, then variable COUNT1 will, if needed, be successively matched against all the remaining upper and lower limit values for against all the remaining frequency values in order to find an appropriate window. Specifically, decision block 672 determines whether the value of variable GOODCNT is greater than zero, i.e. whether any valid frequency determinations have been made. In the event a valid frequency determination has previously been made but the present tine period measurement does not fall within the corresponding window for this measured frequency, then an error condition has occurred, i.e. the present cycle being measured is yielding an invalid result. As a result, decision block 672 routes execution, via YES path 673 and path 675, back to block 630 in order to increment the current value of variable SERROR and appropriately process the error condition.

Alternatively, if no prior valid frequency determination has been made during this scan of the loop, then decision block 672 routes execution, via NO path 674, to decision block 678. This latter decision block determines whether the value of variable COUNT1 has been matched against the limit values for all four permissible frequency values. If the limit values for all four frequency values have been successively tried without a match occurring, then an error condition has occurred. In this case, decision block 678 routes execution, via YES path 679 and path 675, back to block 630 in order to increment the value of variable SERROR and appropriately process the error condition. Alternatively, if the limit values for any frequency value have not yet been used, then decision block 678 routes execution, via its NO path, to block 682. This latter block, when executed, sets the value of the RETRY bits to correspond to the next frequency value to be tested. Once this occurs, execution proceeds, via path 683, back to block 665 to read the limit values for this frequency and so on.

In the event that the contents of variable COUNT1 are found to be within a window for one of the four permissible frequency values, then decision block 685 routes execution, via its YES path, to block 689. This latter block, when executed, increments the value of variable GOODCNT by one. As noted, the time period measuring process is repeated over a pre-determined number of cycles of the incoming tone from the LVM. All of these cycles must yield the same frequency determination in order to permit the LTU to store the corresponding number of this frequency (i.e. the value of the RETRY bits) within the signature bits for the current loop being scanned. Specifically, once block 689 executes, execution proceeds to decision block 690. This block tests whether the value of variable GOODCNT equals a pre-determined limit, the value of variable GOODCHK, i.e. here the number of successively occurring cycles of the tone transmitted by the LVM that must yield the same frequency determination. If the value of variable GOODCNT is less than the value of variable GOODCHK, then an insufficient number of cycles has been measured, in which case, decision block 690 routes execution, via NO path 691 and path 638, back to block 608 to measure the next cycle. If, however, the value of variable GOODCNT equals the value of variable GOODCHK indicating that the correct frequency value has been measured over the desired number of successively occurring cycles of the incoming tone from the LVM, then decision block 690 routes execution, via YES path 692, to block 694. This latter block clears the ERRORS field in the LSBYTE for the current loop by setting this field equal to zero. Thereafter, block 696 is executed to set the Range Failure bit in this LSBYTE to zero. Lastly, execution proceeds to block 698 which, when executed, sets the value of the signature bits in the LSBYTE for the current loop to the value of the RETRY bits. Once this has occurred, execution returns to Main Loop 400 from routine 600.

5. Line Check Routine 700

As noted above, Line Check Routine 700, which also executes as part of Main Loop 400, advances the scan to the next loop. In addition, after the last loop. i.e. the 25th loop, is scanned, routine 700 performs a self test of the analog filter circuitry used in the LTU.

Figure 7B:
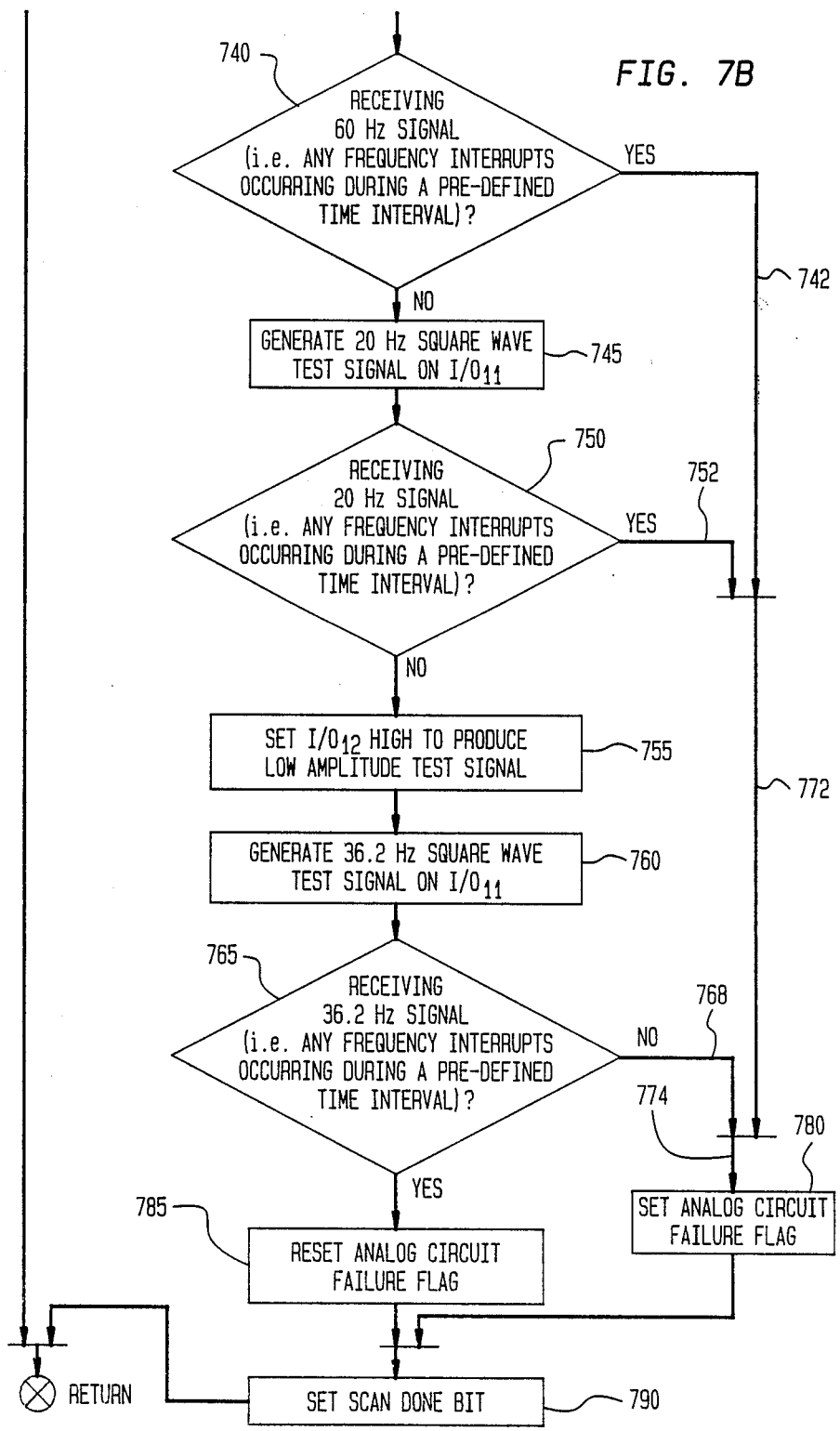

A flowchart of Line Check Routine 700 is collectively depicted in FIGS. 7A-7D, for which the correct alignment of the drawing sheets for these figures is shown in FIG. 7.

Upon entry into this routine, execution proceeds to block 705 which, when executed, increments the current value of the line pointer (variable LPOINT) by one. Execution then passes to decision block 710. This decision block tests whether the last loop has been scanned, i.e. whether the value of variable LPOINT equals a value associated with the 26th loop. In the event the last loop has not yet been scanned, then execution returns from routine 700, via NO path 712 that emanates from decision block 710. However, if the last loop has been scanned, the decision block 710 routes execution, via its YES path, to decision block 715. This block determines, from the current value of the loop counter (LCOUNT), whether twelve or less loops are currently active. If a small number of loops are active, then the time period consumed by scanning all the loops might be insufficient to allow any transients that occur on any of these loops to settle down between individual scanning cycles of that loop. Therefore, if the number of active loops is twelve or less, then decision block 715 routes execution, via its YES path, to block 720 which sets the values of both the line counter and line pointer to zero. Thereafter, execution proceeds to block 725 which, when executed, causes microcomputer 370 (see FIGS. 3A-3C) to wait for an appropriate amount of time to elapse that is sufficient to set the time interval consumed by the current scanning cycle equal to the time needed to scan twelve loops, i.e. approximately 4-5 seconds. The length of the elapsed time during which the microcomputer is waiting depends upon the exact number of active loops. A complete scanning cycle by the LTU of 25 active loops will consume between approximately 8-10 seconds. After block 725 has fully executed, then, as shown in FIGS. 7A and 7B, execution proceeds to block 730 to begin the self test. Execution also reaches block 730, via NO path 718 emanating from decision block 715, if more than twelve loops are currently active.

Blocks 730-785 perform a self test of the analog filter circuitry in the LTU and appropriately set or reset an ANALOG CIRCUIT FAILURE flag depending upon the results of the test. Specifically, block 730, when executed, sets the voltage level on microcomputer pin I/O$_{12}$ (see FIGS. 3A-3C) low in order to produce a high level test signal on lead 389. Thereafter, as shown in FIGS. 7A and 7B, block 735 is executed to produce a 60 Hz square wave test signal on microcomputer pin I/O$_{11}$ (see FIGS. 3A-3C). Once this occurs as shown in FIGS. 7A and 7B, execution proceeds to decision block 740 which, after a finite period of time has elapsed sufficient for filters 338, 342 and 346 (see FIGS. 3A-3C) to settle down, determines whether any of the 60 Hz signal is propagating through the filters, specifically whether any frequency interrupts are being generated by flip flop 368. Under normal operation, no such interrupts should be generated. If no such interrupts are being generated, then, as shown in FIGS. 7A and 7B, decision block 740 routes execution, via its NO path, to block 745. Block 745, when executed, changes the frequency of the square wave test signal on microcomputer pin I/O$_{11}$ to 20 Hz. Thereafter, decision block 750 which, after a finite period of time has elapsed sufficient for the filters to settle down, determines whether any of the 20 Hz signal is propagating through the filters, specifically whether any frequency interrupts are being generated by flip flop 368. Under normal operation, no such interrupts should be generated. If no such interrupts are being generated, then decision block 750 routes execution, via its NO path, to block 755. Block 755, when executed, sets the voltage level on microcomputer pin I/O$_{12}$ high in order to produce a low level test signal on lead 389. Once this occurs, block 760 is executed to change the frequency of the square wave test signal on microcomputer pin I/O$_{11}$ to approximately 36.2 Hz. Thereafter, decision block 765 executes which, after a finite period of time has elapsed sufficient for the filters to settle down, determines whether any of the low level 36.2 Hz signal is propagating through the filters, specifically whether any frequency interrupts are being generated by flip flop 368. Under normal operation, such interrupts should be generated. Hence, if these interrupts are occurring, then decision block 765 routes execution, via its YES path, to block 785. This block resets the value of the ANALOG CIRCUIT FAILURE flag. The status of this flag can be reported to controller 32 (see FIGS. 1A and 1B) whenever it sends an appropriate request to microcomputer 370 in the LTU. Once block 785 executes, execution proceeds, as shown in FIGS. 7A and 7B, to block 790 which sets the SCAN DONE flag. This flag indicates that a complete scan of twenty five lines has been completed. Once this flag is set, as discussed below, the status of all the loops scanned by the LTU can be reported to the controller. After block 790 has executed, execution returns to Main Loop 400 from routine 700. Alternatively, if interrupts were generated during application of the high level 60 or 20 Hz test signals or interrupts did not occur during application of the low level 36.2 Hz test signal, then decision block 740, 750 or 765 routes execution over respective paths 742, 772 and 774; 752, 772 and 774; or 768 and 774 to block 780. This block, when executed, sets the ANALOG CIRCUIT FAILURE flag to indicate to the controller that the analog circuitry in the LTU has failed. Whenever the controller is notified that such a failure has occurred, the controller will appropriately notify the local telephone company and the alarm company in order to initiate appropriate corrective action. Once this flag has been set, execution proceeds to block 790 to set the SCAN DONE flag. Thereafter, execution returns from this routine back to Main Loop 400.

6. Interrupt Service Routine 800

This routine processes the external interrupts, i.e. the "frequency" and "controller" interrupts.

A flowchart of Interrupt Service Routine 800 that is executed by microcomputer 370 whenever an external interrupt occurs is depicted in FIG. 8.

Upon entry into this routine, execution proceeds to block 810 which, when executed, saves the value (contents) of the accumulator of the microcomputer. The saved value will be restored to the accumulator at the conclusion of this routine. Once block 810 has executed, block 820 executes to apply a pulse to microcomputer pin I/O$_{15}$ (see FIGS. 3A-3C) to reset flip flop 368. Once this occurs, a shown in FIG. 8, block 830 executes to write the current contents of the internal timer (timer 377 shown in FIGS. 3A-3C) into variable COUNT1. Then, as shown in FIG. 8, execution proceeds to decision block 840 which, when executed, determines whether the external interrupt was initiated by controller 32 (see FIGS. 1A and 1B) by testing the voltage level at microcomputer pin T$_0$. This level, as discussed above, will be high whenever a "controller" interrupt has occurred. In the event this interrupt was generated by the controller, then decision block 840 routes execution, via its YES path, to block 850 which, when executed, disables the external interrupts. Thereafter, block 860 executes Controller Service Routine 900, which is discussed below in conjunction with FIG. 9, to appropriately process an incoming request from the controller. After this routine fully executes, block 870 executes to enable the external interrupts. Execution then proceeds to block 880 which, when executed, restores the previously saved value to the accumulator. Execution also reaches block 880, via NO path 845 emanating from decision block 840, in the event the external interrupt was not initiated by the controller, i.e. the interrupt was a "frequency" interrupt. Once block 880 executes, execution proceeds to block 890 which, when executed, loads the offset value "$47_{10}$" into the internal timer for use in measuring the period of the next cycle of an incoming tone from an LVM. Execution then returns from this routine.

7. Controller Service Routine 900

As noted above, Controller Service Routine 900 appropriately processes a request from controller 32 (see FIGS. 1A and 1B). This request involves instructing the LTU to: change the status of a line (active to inactive or vice versa), download to the controller the contents of the LSBYTEs for all active loops, accept a download from the controller of all the signatures and accompanying line numbers for all active loops currently being scanned by the LTU and report to the controller the current result of the analog self test undertaken by the LTU.

Figure 9:
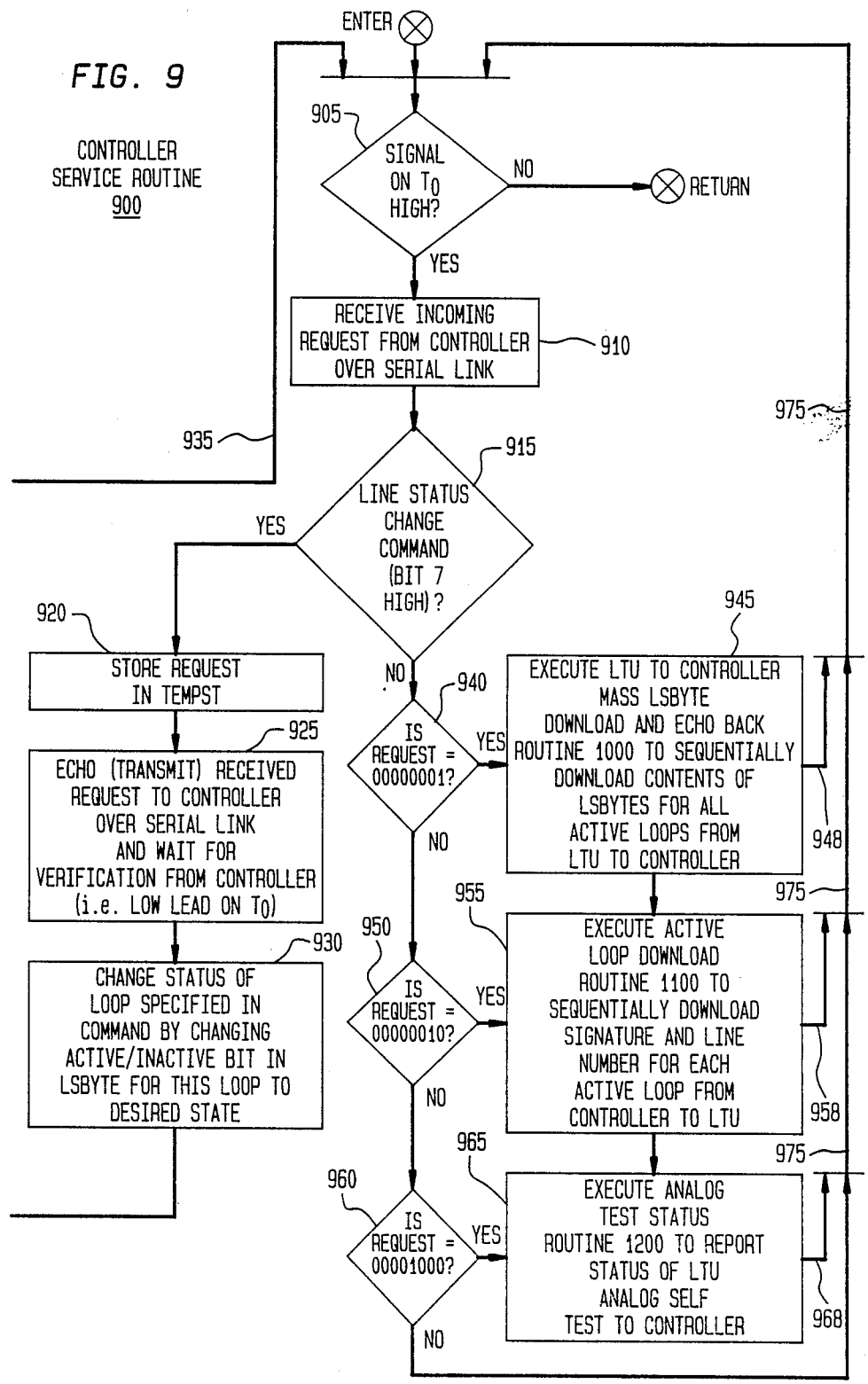
FIG. 9 depicts a flowchart of Controller Service Routine 900 that is executed as part of Interrupt Service Routine 800.

FIG. 9 depicts a flowchart of Controller Service Routine 900 that is executed as part of Interrupt Service Routine 800.

As shown, upon entry into this routine, execution proceeds to decision block 905 to determine if the status of microcomputer pin $T_0$ is high. As discussed below, this pin is set to a high level whenever the controller addresses this LTU, e.g. LTU $34_1$ shown in FIGS. 3A–3C. During the course of processing a request from the controller, the LTU will echo back the request sent by the controller. The controller, after verifying the accuracy of the echoed information it receives from the LTU, will cease addressing this LTU. This will cause the signal on pin $T_0$ to fall to a low state. Should block 905 find this state to be low, as shown in FIG. 9, then this decision block will direct execution to return from this routine back to routine 800 via the NO path emanating from this decision block. Alternatively, if the state of the level on this pin remains high, then the controller is still requesting service from the LTU. In this case, decision block 905 directs execution, via its YES path, to block 910. This latter block, when executed, receives the incoming request (one eight bit byte) from the controller over serial link 35 (see FIGS. 3A–3C). Next, as shown in FIG. 9, execution proceeds to decision block 915 to determine if the request contains a line status change command. Such a command is identified by a one in bit seven of the received request. A line status change command is used by the controller to change the status of any one specified loop. If the request contains such a command, then decision block 915 routes execution, via its YES path, to block 920. This block stores the request in a temporary storage location, TEMPST. Once this occurs, execution proceeds to block 925 which, when executed, causes the LTU to serially echo (transmit) the entire request it received from the controller back to the controller and then wait for the controller to verify the accuracy of the echoed request. As noted, verification is sensed when the controller removes the addressing signals from the LTU and a corresponding low level appears on microcomputer pin $T_0$. After verification has been detected by the microcomputer, execution proceeds to block 930. This block, when executed, changes the status of the loop that has been specified in the request from active to inactive or vice versa by appropriately toggling the state of the active/inactive bit (bit 4) in the LSBYTE for that loop. Once this has occurred, execution loops back, via path 935, to decision block 905 to return from this routine.

Alternatively, in the event that the incoming request is not a line status change command, then decision block 915 routes execution to blocks 940–965 to further interpret the request. Specifically, decision block 940 tests whether the request has the value "00000001". If the request has this value, then decision block 940 routes execution to block 945 which executes LTU to Controller Mass LSBYTE Download and Echo Back Routine 1000 (which is discussed below in conjunction with FIGS. 10A and 100B) to instruct the microcomputer to sequentially download the contents of every LSBYTE for all active loops currently being scanned to the controller over the serial link. Alternatively, if the request does not have this value, then decision block 940 routes execution, via its NO path, to decision block 950. This decision block tests whether the request has the value "00000010". If the request has this value, then decision block 950 routes execution to block 955 to execute Active Loop Download Routine 1100 (which is discussed in detail below in conjunction with FIG. 11) to instruct the microcomputer to accept a download from the controller of signature and accompanying line numbers for all active loops in the LTU. Now, if the request does not have this value, then decision block 950 routes execution, via its NO path, to decision block 960. This decision block tests whether the request has the value "00001000". If the request has this value, then decision block 960 routes execution to block 965 to instruct the microcomputer to execute Analog Test Status Routine 1200 to report the status of the analog self test to controller 32. Once either block 945, 955 or 965 has executed, then execution proceeds via paths 948 and 975, 958 and 975, and 968 and 975 back to decision block 905.

8. LTU to Controller Mass LSBYTE Download and Echo Back Routine 1000

As discussed above, LTU to Controller Mass LSBYTE Download and Echo Back Routine 1000 causes the microcomputer in the LTU to download to the controller the contents of all the LSBYTEs for all active loops currently being scanned.

Figure 10B:
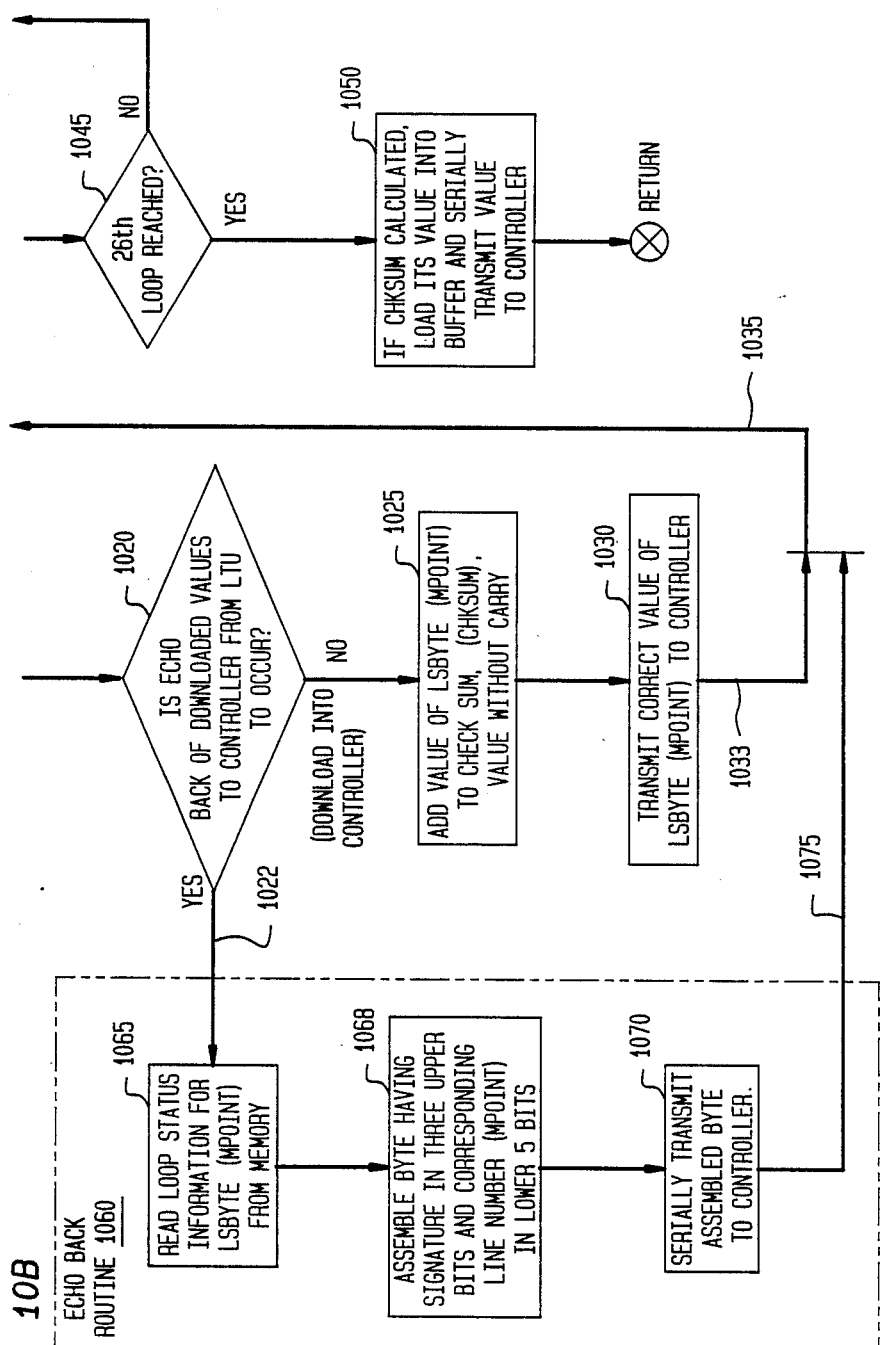

A flowchart of LTU to Controller Mass LSBYTE Download and Echo Back Routine 1000 is collectively depicted in FIGS. 10A and 10B, for which the proper alignment of the drawing sheets for these figures is shown in FIG. 10.

Upon entry into this routine, execution proceeds to decision block 1001 to determine whether a complete scan has been made of all the active loops such that status information of all these loops can be downloaded into the controller. Specifically, decision block 1001 tests the state of the SCAN DONE flag. If this flag is zero, indicative of an incomplete scan, then decision block 1001 routes execution, via its NO path, to block 1003. This latter block, when executed, transmits an appropriate message to the controller specifying that a download of loop status information (i.e. the values of all the LSBYTEs for all the active loops) from the LTU can not occur at this time. Thereafter, execution returns back to Controller Service Routine 900 from routine 1000.

Alternatively, if the SCAN DONE flag is high, then decision block 1001 routes execution, via its YES path, to block 1005. This latter block, when executed, loads a pointer, (MPOINT), with an appropriate value to point to the LSBYTE for the first loop scanned by the LTU. Once this occurs, execution proceeds to block 1010 to read the LSBYTE associated with this loop. Thereafter, execution proceeds to decision block 1015 to determine whether this loop is active by testing the state of the active/inactive bit, i.e. bit 4, in this LSBYTE. If this loop is inactive, then decision block 1015 routes execution, via its NO path, to block 1040. Alternatively, if this loop is active, then decision block 1015 routes execution, via its YES path, to decision block 1020. This latter decision block determines whether the current request requires echo back of received signature and line number information. Since this routine is utilized as part of Controller Service Routine 900 to handle mass downloads of loop status bytes from the LTU to the Controller and by Controller to LTU Download Routine 1100 to handle echo back of separate bytes containing signature and accompanying line numbers that have been received for all active loops from the controller, decision block 1020 routes execution to block 1025 to handle downloads into the controller or to echo back routine 1060 to handle echo back of bytes containing signature and line number information. Now, if the current request calls for a mass download of LSBYTEs for all active loops from the LTU into the controller, then echo back is not required and decision block 1020 routes execution, via its NO path, to block 1025. This latter block, when executed, computes an eight bit checksum by adding the value of the LSBYTE for the current loop, i.e. loop (MPOINT), to an existing checksum (CHKSUM) value without carry. Once this occurs, execution proceeds to block 1030 which serially transmits the value of this LSBYTE, i.e. LSBYTE (MPOINT), to the controller. Once this transmission has been completed, execution proceeds, via paths 1033 and 1035, to block 1040.

Alternatively, if the current request calls for echo back of bytes containing signature and line number information that have just been downloaded into the LTU from the controller, then decision block 1020 routes execution, via YES path 1022, to echo back routine 1060. Upon entry into this routine, block 1065 is executed to read the loop status information, i.e. LSBYTE, for the current loop, i.e. loop (MPOINT). Once this has occurred, execution proceeds to block 1068 which assembles a byte that contains the signature for this loop in the upper three bits followed by the line number for this loop in the lower five bits. This format matches the format in which this information was downloaded to the LTU by the controller. By accessing memory and then assembling the byte based upon accessed data rather than merely echoing the received byte, an increased level of data verification is produced. Once this byte is assembled, execution proceeds to block 1070 which, when executed, serially transmits the assembled byte back to the controller over serial link 35. After this has occurred, execution proceeds, via path 1075, to block 1040.

Block 1040, when executed, increments the value of the pointer MPOINT by one to point to the next loop in succession. Thereafter, execution proceeds to decision block 1045 which determines if the 26th loop has been reached, i.e. if a scan of all 25 loops has just been completed. If such a scan has not been completed, i.e. the value of MPOINT has not reached the address for the 26th loop, then decision block 1045 routes execution, via NO path 1047, back to block 1010 to read the LSBYTE for the next loop. Alternatively, if the scan is complete, then decision block 1045 routes execution, via its YES path, to block 1050 which, when executed, loads the current value of the checksum into a buffer and then serially transmits this value to the controller. Once this occurs, execution returns back to Controller Service Routine 900 from routine 1000.

To periodically obtain status information regarding all the loops being verified by the inventive system, i.e. those loops connected to illustrative LTU $34_1$ and all the other different LTUs in the system regardless of whether the LTUs are located in the same rack as LTU $34_1$ or in different racks, the controller will successively send a separate mass download request to each LTU in the system. In particular, an LTU will receive a mass download command, then download the contents of all its LSBYTEs for currently active loops into the controller and lastly have this status information processed by the controller before the controller transmits a mass download request to the next LTU in sequence. Such requests are continually sent by the controller to all the LTUs in a circular sequence in order to ensure the controller has received current status information for each loop that is being verified by any LTU.

9. Controller to LTU Download Routine 1100

As noted above, Controller to LTU Download Routine 1100 instructs the microcomputer to accept a download from the controller of signature and accompanying line numbers for all active loops in that LTU. This download takes the form of a succession of eight bit bytes. Each byte contains the signature and accompanying line number for a particular active loop. Only those bytes for all active loops are successively downloaded by the controller and stored in the LTU during execution of this routine.

FIG. 11 depicts a flowchart of Controller to LTU Download Routine 1100 that is also executed as part of Controller Service Routine 900.

Upon entry into this routine, execution proceeds to block 1110. This block, when executed, reads an incoming byte from the controller and stores the information contained therein in a temporary bit string register, BITSTR. Thereafter, execution proceeds to decision block 1120 which tests the contents of the received byte to determine whether it is an "end of download" delimiter, i.e. whether the value of this byte matches "00011111". If a match does not occur, then decision block 1120 routes execution, via its NO path, to block 1140. This latter block, when executed, extracts from the received byte both the signature value, which is stored in the upper three bits in this byte, and the line number, which is stored in the lower five bits of this byte, of the loop that is to have this signature. Thereafter, execution proceeds to block 1150 which stores the signature value in the upper three bits of the LSBYTE for the current loop and also sets the active/inactive bit (bit 4) in this LSBYTE high to indicate that this loop is now active. Once this has occurred, execution loops back, via path 1155, to block 1110 to obtain the next incoming byte from the controller.

Now, in the event that an end of download delimiter has been received, then decision block 1120 routes execution, via its YES path, to block 1130. This latter block executes LTU to Controller Mass LSBYTE Download and Echo Back Routine 1000 to read the contents of the LSBYTE for an active loop, assemble a byte containing the signature value for that loop in the upper three bits and the accompanying line number in the lower five bits, serially transmit this assembled byte back to the controller and then sequentially repeat this process for every remaining active loop in the LTU. Once this has occurred, execution returns back to Controller Service Routine 900 from routine 1100.

10. Analog Test Status Routine 1200

As noted above, Analog Test Status Routine 1200 reports the current result of the analog self test undertaken by the LTU to the controller.

Figure 12:
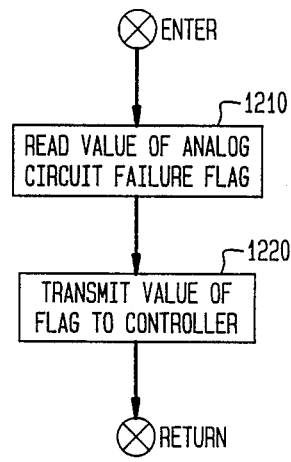
FIG. 12 depicts a flowchart of Analog Test Status Routine 1200 that is also executed as part of Controller Service Routine 900.

FIG. 12 shows a flowchart of Analog Test Status Routine 1200 that is also executed as part of Controller Service Routine 900. Specifically, upon entry into this routine, execution proceeds to block 1210 to read the current value of the Analog Circuit Failure Flag. Thereafter, execution proceeds to block 1220 to serially transmit the value of this flag to the controller. Once this occurs, execution returns from routine 1200 back to Controller Service Routine 900.

11. Timer Interrupt Service Routine 1300

As noted above, Timer Interrupt Service Routine 1300 processes the interrupt associated with an overflow of timer 377 (see FIGS. 3A-3C) located within the microcomputer.

Figure 13:
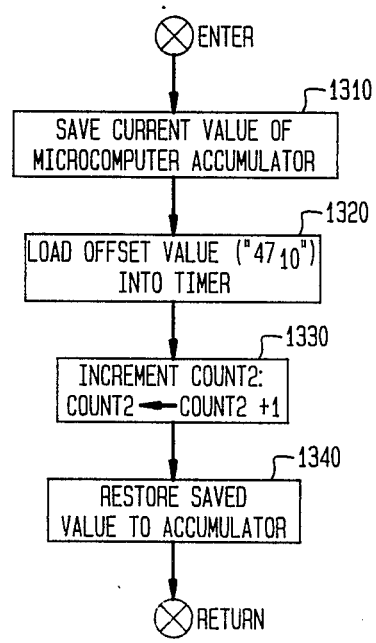
FIG. 13 depicts a flowchart of Timer Interrupt Service Routine 1300 that is executed whenever an internal timer interrupt (overflow of timer 377 shown in FIGS. 3A-3C) occurs within microcomputer 370.

A flowchart of Timer Interrupt Service Routine 1300 is shown in FIG. 13. Upon entry into this routine, execution proceeds to block 1310, which, when executed, saves the current contents of the microcomputer accumulator. Thereafter, block 1320 executes to load the offset value, "47$_{10}$" into the internal timer. Once this has occurred, execution proceeds to block 1330 which increments the value stored in variable COUNT2 to account for the present timer overflow. Thereafter, execution proceeds to block 1340 which restores the saved value to the accumulator of the microcomputer. Once this has occurred, execution returns from this interrupt service routine.

Thus, as is now readily apparent, the inventive system can generally be used to continually verify any end-to-end communication path. To do so, circuitry, similar in overall function to the first embodiment of the line verification module, would be located at the far end of the path to detect one or more conditions thereat that are indicative of normal operation of the path. As long as the path is normally operating at the far end, this circuitry would then transmit a test signal over the path in which the test signal is substantially transparent to normal communication occurring over that path. Alternatively, if a slightly lessened degree of loop verification could be tolerated and a cost savings is desired, then circuitry, similar in overall function to the second embodiment of the line verification module, could be located at the far end of a communications path to continuously transmit the test signal thereover. Detecting and, if needed, scanning circuitry, similar in overall function to the line test unit, would be connected to the path at its near end to detect any cessation or unexpected change (i.e. a mismatch against a prescribed test signal that is expected to appear over the path) in the test signal indicative of a possible loss of path integrity and, in turn, provide an appropriate notification. In this regard, the inventive system can readily be used to verify the integrity of "dry" lines, i.e. dedicated lines, which do not utilize normal telephone company signalling.

In addition, the inventive system though described as using either one of the two embodiments of the line verification module could, in fact, use both embodiments simultaneously, wherein an LVM, similar or identical to the first embodiment thereof (i.e. LVM 28 shown in FIG. 2), would be connected to a far end of a subscriber loop or communications path that requires a heightened level of verification and an LVM, similar or identical to the second embodiment thereof (i.e. LVM 1400 shown in FIG. 14), would be connected to the far end of every other subscriber loop or communication path that is to be verified.

Clearly, those skilled in the art realize that even though the inventive system is described as relying on transmitting one of several pre-selected frequencies onto each subscriber loop (or more generally any suitable communication path) for verification purposes, to further enhance the security of the system, any pre-defined combination of two or more tones and/or known on-off patterns (e.g. cadence) of one or more transmitted tones can be used instead of a single frequency as long as the combination and/or pattern is readily detectable by detecting circuitry situated at the near end location.

Although various embodiments of the inventive loop status verification system have been shown and described in detail herein, those skilled in the art may readily construct many other embodiments that still incorporate the teachings of the present invention.

We claim:

1. A system for verifying the integrity of a communication path that connects near end and far end locations comprising:
   first means situated at the far end location comprising:
   means connected to said communication path for monitoring a characteristic of said path detectable at the far end thereof and indicative of whether the path is in an on-hook or off-hook condition;
   means for generating a pre-defined test signal on a substantially continuous basis, wherein said test signal is substantially transparent to communication that will be carried over the path; and
   means, responsive to the monitored characteristic and to said test signal generating means and connected to said path, for varying the amplitude of the generated test signal depending upon whether the path is in an on-hook or off-hook condition so as to produce a first signal and for injecting the first signal onto said path, such that the amplitude of the test signal that appears on the path remains essentially constant regardless of the whether the path exists in an on-hook or off-hook condition; and
   second means situated at the near end location comprising:
   means connected to said path for detecting whether the test signal appears thereon and for providing a control signal corresponding thereto; and
   means responsive to said control signal for producing an appropriate notification if the test signal is absent from said path or does not match a prescribed test signal that is expected to appear on the path.

2. The system in claim 1 wherein said pre-defined test signal is a pre-selected sub-audible tone.

3. The system in claim 2 wherein said communication path comprises at least a two wire subscriber loop having separate tip and ring sides and said characteristic monitoring means comprises means for monitoring loop current flowing in said subscriber loop.

4. The system in claim 3 wherein said notification producing means further comprises:
means for storing a value of a pre-defined parameter of said prescribed test signal;
means for measuring a value of the parameter of said test signal that appears on said path; and
means for comparing the measured value of said parameter against the stored value of said parameter so as to determine whether said test signal that appears on said path matches said prescribed test signal.

5. The system in claim 4 wherein said notification producing means further comprises:
means, responsive to said control signal, for successively determining whether said pre-defined test signal appears on said path during each of a pre-determined number of measurement intervals; and
means, responsive to said successively determining means, for producing said notification, after a pre-defined number of measurement intervals has elapsed, if the pre-defined test signal is absent from said path or if the measured value of said parameter does not match the stored value of said parameter.

6. The system in claim 5 further comprising:
a plurality of subscriber loops wherein each of the loops emanates from the near end location and runs to a corresponding one of a plurality of far end locations; and
a separate one of the first means connected to a corresponding one of each of said loops at a far end location thereof; and
wherein said second means further comprises: means, connected to each of said paths at a near end location thereof, for successively scanning each of said paths on a continual basis during successive measurement intervals and for routing the sub-audible tone appearing on each of the loops to said detecting means.

7. The system in claim 2 wherein the notification producing means further comprises means for accessing from a memory a value of a pre-defined parameter for the prescribed test signal that is to appear over the path and, if no value is currently stored in the memory for said pre-defined parameter, setting the value of said pre-defined parameter for said prescribed test signal to a measured value of the test signal that appears on the path.

8. The system in claim 7 wherein the notification producing means further comprises:
means for selecting one of a plurality of known values for the frequency of the prescribed test signal that is to appear over the path; and
means, responsive to said control signal, for successively determining whether the test signal that appears on the path throughout a pre-defined number of measurement intervals has a frequency value that matches, within a given range, the one selected value and, in response thereto, storing the one selected value in the memory as said pre-defined parameter for said corresponding path.

9. The system in claim 8 wherein said notification producing means further comprises:
means, responsive to said control signal, for successively determining whether the sub-audible tone having a corresponding pre-defined sub-audible frequency appears on the path during each of a pre-determined number of measurement intervals; and
means, responsive to said successively determining means, for producing said notification, after a pre-defined number of measurement intervals has elapsed, if the tone is absent from the path or has a frequency value that does not match a stored frequency value associated with a prescribed test signal that is to appear over the path.

10. The system in claim 9 further comprising:
a plurality of subscriber loops wherein each of the loops emanate from the near end location and run to a corresponding one of a plurality of far end locations; and
a separate one of the first means connected to each one of the loops at a far end location thereof; and
wherein said second means further comprises: means, connected to each of said loops at a near end location thereof, for successively scanning each of said loops on a continual basis during successive measurement intervals and for routing the sub-audible tone appearing thereon to said detecting means.

11. The system in claim 10 wherein the second means further comprises:
a plurality of separately addressable line test units, wherein each of the line test units verifies a separate pre-defined group of loops; and
a controller for downloading status information regarding each of all currently active loops in a corresponding group of loops into a corresponding one of the line test units and accepting information regarding each of the loops in each group from each of the corresponding line test units and, in response to said accepted information, producing said notification.

12. The system in claim 2 wherein said communication path comprises at least a two wire subscriber loop having separate tip and ring sides and said characteristic monitoring means comprises means for monitoring loop current flowing in said subscriber loop, and said system further comprises: means for accessing from a memory a value of a pre-defined parameter for the prescribed test signal that is to appear over the path and, if no value is currently stored in the memory for said pre-defined parameter, setting the value of said pre-defined parameter for said prescribed test signal to a measured value of the test signal that appears on the path.

13. The system in claim 12 wherein said notification producing means further comprises:
means for storing a value of a pre-defined parameter of said prescribed test signal;
means for measuring a value of the parameter of said test signal that appears on said path; and
means for comparing the measured value of said parameter against the stored value of said parameter so as to determine whether said test signal that appears on said path matches said prescribed test signal.

14. The system in claim 13 wherein said notification producing means further comprises:
means, responsive to said control signal, for successively determining whether said pre-defined test signal appears on said path during each of a pre-determined number of measurement intervals; and means, responsive to said successively determining means, for producing said notification, after a pre-defined number of measurement intervals has elapsed, if the pre-defined test signal is absent from said path or if the measured value of said parameter does not match the stored value of said parameter.

15. The system in claim 12 wherein the notification producing means further comprises:
means for selecting one of a plurality of known values for the frequency of the prescribed test signal that is to appear over the path; and
means, responsive to said control signal, for successively determining whether the test signal that appears on the path throughout a pre-defined number of measurement intervals has a frequency value that matches, within a given range, the one selected value and, in response thereto, storing the one selected value in the memory as said pre-defined parameter for the path.

16. The system in claim 15 wherein said notification producing means further comprises:
means, responsive to said control signal, for successively determining whether the sub-audible tone having a corresponding pre-defined sub-audible frequency appears on the path during each of a pre-determined number of measurement intervals; and
means, responsive to said successively determining means, for producing said notification, after a pre-defined number of measurement intervals has elapsed, if the tone is absent from the path or has a frequency value that does not match a stored frequency value associated with a prescribed test signal that is to appear over the path.

17. In a system for verifying the integrity of a two-wire subscriber loop having separate tip and ring sides, a line verification module for connection to said loop at the far end thereof comprising:
means connected to said loop for monitoring a characteristic of said loop detectable at the far end thereof and indicative of whether the loop is in an on-hook or off-hook condition;
means for generating a pre-defined test signal on a substantially continuous basis, wherein said test signal is substantially transparent to communication that will be carried over the loop; and
means, responsive to the monitored characteristic and to said test signal generating means and connected to said loop, for varying the amplitude of the generated test signal depending upon whether the loop is in an on-hook or off-hook condition so as to produce a first signal and for injecting the first signal onto said loop, such that the amplitude of the test signal that appears on the loop remains essentially constant regardless of whether the loop exists in an on-hook or off-hook condition.

18. The line verification module in claim 17 further comprising:
means connected to one side of the subscriber loop for detecting loop current as said characteristic;
means for programmably selecting one of a plurality of pre-defined sub-audible tones as said test signal;
a tone generator, responsive to said programmable selection means, for generating said pre-defined sub-audible tone as said test signal; and
means, responsive to said loop current detecting means and to said test signal, for varying the amplitude of test signal in response to whether said loop is in an on-hook or off-hook condition in order to produce the first signal.

19. A method for verifying the integrity of a communication path that connects near end and far end locations comprising the steps of:
at the far end location:
monitoring a characteristic of a communication path detectable at the far end thereof and indicative of whether the path is in an on-hook or off-hook condition;
generating a pre-defined test signal on a substantially continuous basis, wherein said test signal is substantially transparent to communication that will be carried over the path; and
varying, in response to the monitored characteristic and to said test signal generating step, the amplitude of the generated test signal depending upon whether the path is in an on-hook or off-hook condition so as to produce a first signal and injecting the first signal onto said path, such that the amplitude of the test signal that appears on the path remains essentially constant regardless of the whether the path exists in an on-hook or off-hook condition; and
at the near end location:
detecting whether the test signal appears on said path and providing a control signal corresponding thereto; and
producing, in response to said control signal, an appropriate notification if the test signal is absent from said path or does not match a prescribed test signal that is expected to appear on the path.

20. The method in claim 19 wherein said pre-defined test signal is a pre-selected sub-audible tone.

21. The method in claim 20 wherein said communication path comprises at least a two wire subscriber loop having separate tip and ring sides and said characteristic monitoring step comprises the step of monitoring loop current flowing in said subscriber loop.

22. The method in claim 21 wherein said notification producing step further comprises the steps of:
storing a value of a pre-defined parameter of said prescribed test signal;
measuring a value of the parameter of said test signal that appears on said path; and
comparing the measured value of said parameter against the stored value of said parameter so as to determine whether said test signal that appears on said path matches said prescribed test signal.

23. The method in claim 22 wherein said notification producing step further comprises the steps of:
successively determining, in response to said control signal, whether said pre-defined test signal appears on said path during each of a pre-determined number of measurement intervals; and
producing, in response to said successively determining step, said notification, after a pre-defined number of measurement intervals has elapsed, if the pre-defined test signal is absent from said path or if the measured value of said parameter does not match the stored value of said parameter.

24. The method in claim 20 wherein the notification step further comprises the steps of:
accessing from a memory a value of a pre-defined parameter for the prescribed test signal that is to appear over the path; and
setting, if no value is currently stored in the memory for said pre-defined parameter, the value of said pre-defined parameter for said prescribed test signal to a measured value of the test signal that appears on the path.

25. The method in claim 24 wherein the notification producing step further comprises the steps of:
selecting one of a plurality of known values for the frequency of the prescribed test signal that is to appear over the path;
successively determining, in response to said control signal, whether the test signal that appears on the path throughout a pre-defined number of measurement intervals has a frequency value that matches, within a given range, the one selected value and, in response thereto, storing the one selected value in the memory as said pre-defined parameter for said corresponding path; and
repeating said selecting and successively determining steps using a next successive value from said plurality of known values in the event said selected one value does not exist on the path throughout said pre-defined number of measurement intervals.

26. The method in claim 25 wherein said notification producing step further comprises the steps of:
successively determining, in response to said control signal, whether the sub-audible tone having a corresponding pre-defined sub-audible frequency appears on the path during each of a pre-determined number of measurement intervals; and
producing, in responsive to said successively determining step, said notification, after a pre-defined number of measurement intervals has elapsed, if the tone is absent from the path or has a frequency value that does not match a stored frequency value associated with a prescribed test signal that is to appear over the path.

27. The method in claim 20 wherein said communication path comprises at least a two wire subscriber loop having separate tip and ring sides and said characteristic monitoring step comprises the step of monitoring loop current flowing in said subscriber loop, and said method further comprises the steps of:
accessing from a memory a value of a pre-defined parameter for the prescribed test signal that is to appear over the path; and
setting, if no value is currently stored in the memory for said pre-defined parameter, the value of said pre-defined parameter for said prescribed test signal to a measured value of the test signal that appears on the path.

28. The method in claim 27 wherein said notification producing step further comprises the steps of:
storing a value of a pre-defined parameter of said prescribed test signal;
measuring a value of the parameter of said test signal that appears on said path; and
comparing the measured value of said parameter against the stored value of said parameter so as to determine whether said test signal that appears on said path matches said prescribed test signal.

29. The method in claim 28 wherein said notification producing step further comprises the steps of:
successively determining, in response to said control signal, whether said pre-defined test signal appears on said path during each of a pre-determined number of measurement intervals; and
producing, in response to said successively determining step, said notification, after a pre-defined number of measurement intervals has elapsed, if the pre-defined test signal is absent from said path or if the measured value of said parameter does not match the stored value of said parameter.

30. The method in claim 27 wherein the notification producing step further comprises the steps of:
selecting one of a plurality of known values for the frequency of the prescribed test signal that is to appear over the path;
successively determining, in response to said control signal, whether the test signal that appears on the path throughout a pre-defined number of measurement intervals has a frequency value that matches, within a given range, the one selected value and, in response thereto, storing the one selected value in the memory as said pre-defined parameter for the path; and
repeating said selecting and successively determining steps using a next successive value from said plurality of known values in the event said selected one value does not exist on the path throughout said pre-defined number of measurement intervals.

31. The method in claim 30 wherein said notification producing step further comprises the steps of:
successively determining, in response to said control signal, whether the sub-audible tone having a corresponding pre-defined sub-audible frequency appears on the path during each of a pre-determined number of measurement intervals; and
producing, in response to said successively determining step, said notification, after a pre-defined number of measurement intervals has elapsed, if the tone is absent from the path or has a frequency value that does not match a stored frequency value associated with a prescribed test signal that is to appear over the path.

32. In a system for verifying the integrity of a two-wire subscriber loop having separate tip and ring sides, a method for use in a line verification module for connection to said loop at the far end thereof comprising the steps of:
monitoring a characteristic of said loop detectable at the far end thereof and indicative of whether the loop is in an on-hook or off-hook condition;
generating a pre-defined test signal on a substantially continuous basis, wherein said test signal is substantially transparent to communication that will be carried over the loop; and
varying, in response to the monitored characteristic and to said test signal generating step, the amplitude of the generated test signal depending upon whether the loop is in an on-hook or off-hook condition so as to produce a first signal and for injecting the first signal onto said loop, such that the amplitude of the test signal that appears on the loop remains essentially constant regardless of the whether the loop exists in an on-hook or off-hook condition.

33. The method in claim 32 further comprising the steps of:
detecting loop current flowing in said subscriber loop;
programmably selecting one of a plurality of pre-defined sub-audible tones as said test signal;
in response to said programmable selection step, said pre-defined sub-audible tone as said test signal; and
varying, in responsive to said loop current detecting step and to said test signal, the amplitude of test signal in response to whether said loop is in an on-hook or off-hook condition in order to produce the first signal.

* * * * *